(12) United States Patent
Zhang

(10) Patent No.: US 8,578,908 B2
(45) Date of Patent: Nov. 12, 2013

(54) DUAL-ROTOR ENGINE

(75) Inventor: Zhenming Zhang, Qingyang (CN)

(73) Assignee: Zhenming Zhang, Gansu (CN)

( * ) Notice: Subject to any disclaimer, the term of this patent is extended or adjusted under 35 U.S.C. 154(b) by 379 days.

(21) Appl. No.: 12/994,552

(22) PCT Filed: May 26, 2009

(86) PCT No.: PCT/CN2009/000589
§ 371 (c)(1),
(2), (4) Date: Feb. 25, 2011

(87) PCT Pub. No.: WO2009/143707
PCT Pub. Date: Dec. 3, 2009

(65) Prior Publication Data
US 2011/0162617 A1    Jul. 7, 2011

(30) Foreign Application Priority Data

May 26, 2008   (CN) .......................... 2008 1 0018292
May 26, 2008   (CN) .......................... 2008 1 0018293

(51) Int. Cl.
*F02B 53/00*    (2006.01)
*F03C 2/00*     (2006.01)
(52) U.S. Cl.
USPC .............................. 123/245; 123/241; 418/36
(58) Field of Classification Search
USPC ........... 123/241, 245, 18 A, 18 R; 418/35–38
See application file for complete search history.

(56) References Cited

U.S. PATENT DOCUMENTS 2,046,989 A * 7/1936 Winter ............................. 418/36
2,053,017 A * 9/1936 Babel ................................ 74/42
3,299,867 A * 1/1967 Ficsur et al. ................. 123/18 R
3,381,669 A * 5/1968 Tschudi ........................... 418/38
3,974,801 A * 8/1976 Brown ........................ 123/18 R (Continued)

FOREIGN PATENT DOCUMENTS

| CN | 1414214 | 4/2003 |
|---|---|---|
| CN | 1564906 | 1/2005 |
| GB | 2007771 | 5/1979 |

*Primary Examiner* — Thomas Denion
*Assistant Examiner* — Ngoc T Nguyen
(74) *Attorney, Agent, or Firm* — Occhiuti & Rohlicek LLP

(57) ABSTRACT

A dual-rotor engine comprises a cylinder assembly, a transmission output mechanism, a rotor control mechanism and a lubrication system. The cylinder assembly comprises a tubular cylinder (6) and two rotors (1*a*, 1*b*). Each of the rotors (1*a*, 1*b*) comprises an inner cylindrical cylinder (99*a*, 99*b*), a rotor journal (20*a*, 20*b*) integrated with the inner cylindrical cylinder (99*a*, 99*b*) and two sector pistons (17*a*, 17*b*) symmetrically secured to the inner cylindrical cylinder (99*a*, 99*b*); four sector pistons (17*a*, 17*b*) of two rotors (1*a*, 1*b*) are arranged crosswise to each other, and two adjacent sector pistons (17*a*, 17*b*) form a combustion chamber. The transmission output mechanism comprises two rotor gears (2*a*, 2*b*) and two driving gears (3*a*, 3*b*) which engaged with each other respectively. Each rotor gear (2*a*, 2*b*) has two symmetrical toothless portions (24) on its periphery; the length and the shape of the toothless portions (24) are the same with those of the portions where the rotor gears (2*a*, 2*b*) engage with the driving gears (3*a*, 3*b*); the teeth numbers of two toothed segments of the rotor gears (2*a*, 2*b*) are equal and the teeth profiles at the start positions of two toothed segments are the same. The rotor control mechanism controls the interval rotation, the stop rotation, the rotating time and the stopping time of two rotors (1*a*, 1*b*) to ensure a uniform and smooth power output.

22 Claims, 22 Drawing Sheets

(56) References Cited

U.S. PATENT DOCUMENTS

| | | | |
|---|---|---|---|
| 4,010,716 A * | 3/1977 | Minka | 123/245 |
| 5,069,604 A * | 12/1991 | Al-Sabih | 418/36 |
| 5,224,847 A | 7/1993 | Kurisu | |
| 2004/0261758 A1 * | 12/2004 | Fong et al. | 123/241 |

* cited by examiner

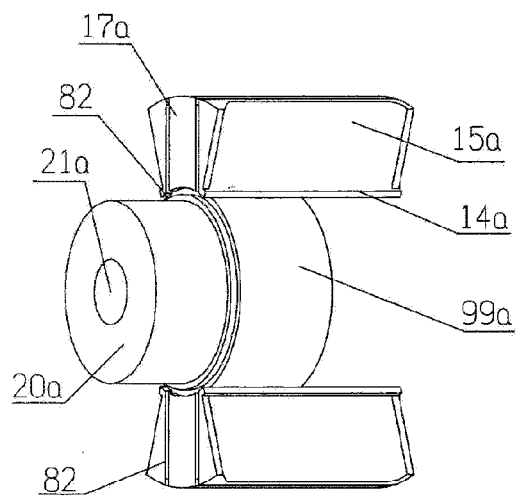
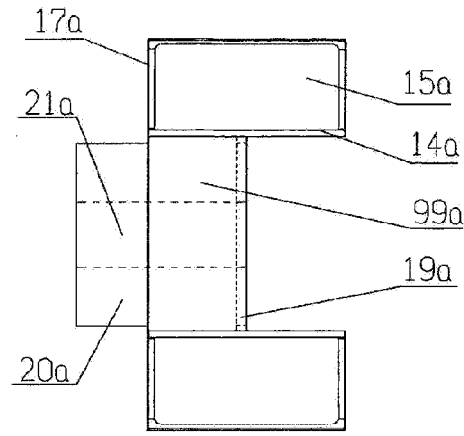
FIG.1-8  FIG.1-9
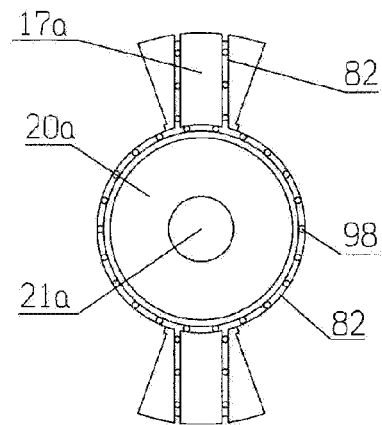
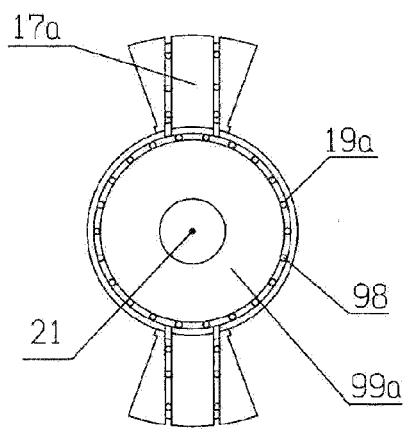
FIG.1-10  FIG.1-11
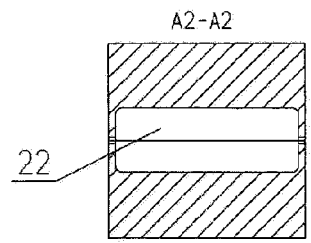
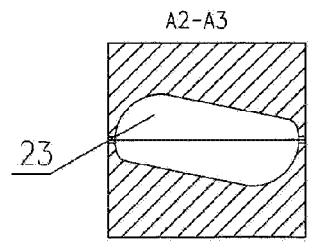
FIG.1-12  FIG.1-13

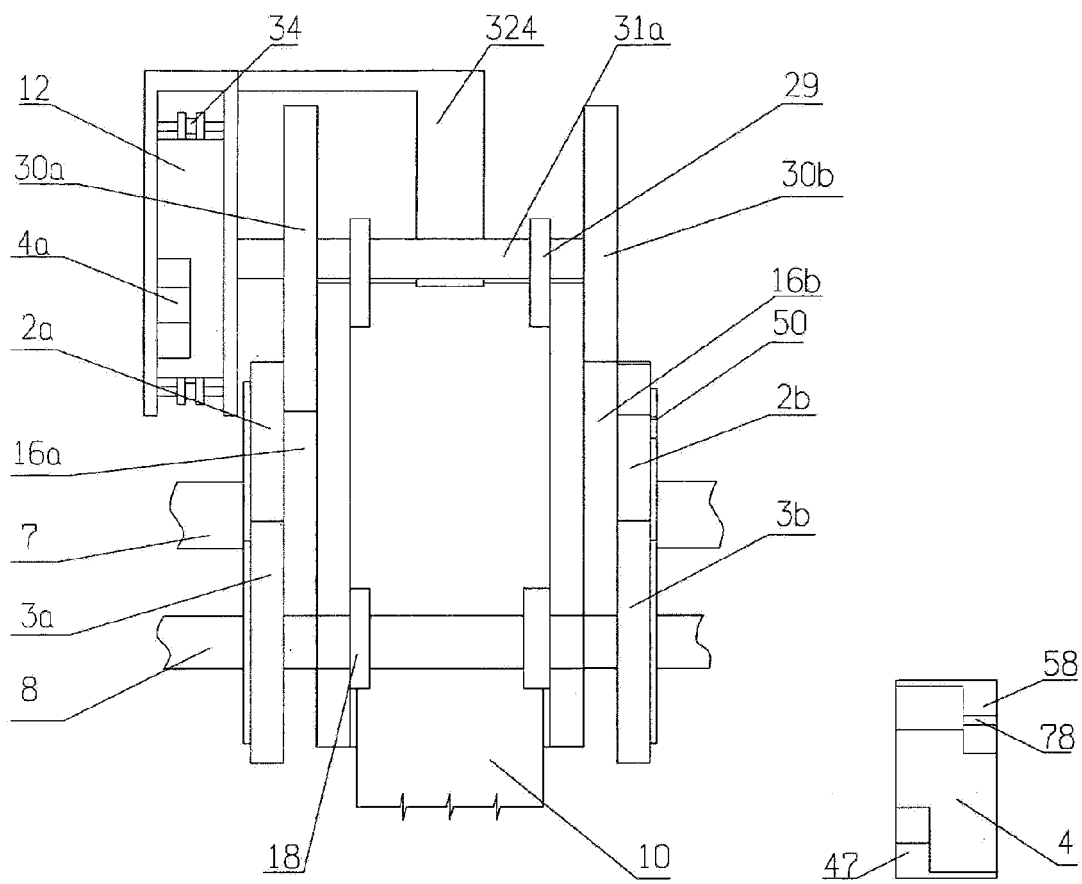
FIG.6-3
FIG.6-12
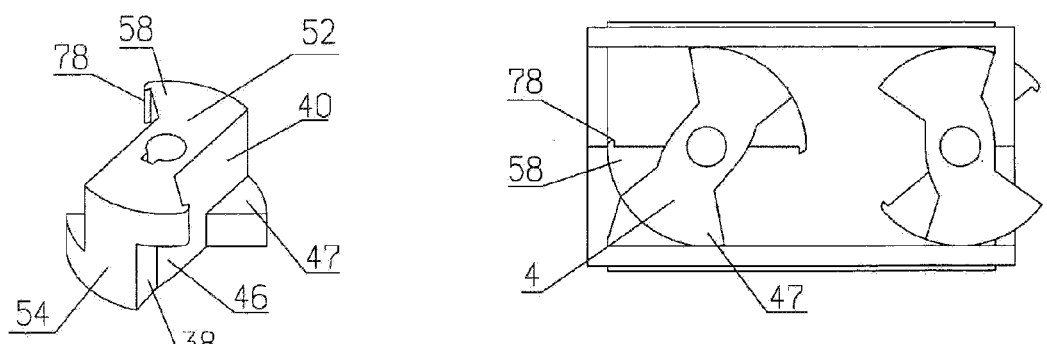
FIG.6-11
FIG.6-13

DUAL-ROTOR ENGINE

CROSS-REFERENCE TO RELATED APPLICATIONS

This application is the National Stage of International Application No. PCT/CN2009/000589, filed on May 26, 2009, which claims the priority of Chinese Patent Application No. 200810018293.0, filed on May 26, 2008 and Chinese Patent Application No. 200810018292.6 filed on May 26, 2008. The contents of these applications are hereby incorporated by reference in their entirety.

FIELD OF THE TECHNOLOGY

The present invention relates to an engine, in particularly to a dual-rotor engine with two rotors.

BACKGROUND OF THE INVENTION TECHNOLOGY

Currently, the reciprocating piston engines are relatively widely-used, and the rotor engines are also used. In order to enhance the efficiency of the engine, the dual-rotor engine has been developed. The dual-rotor engine has a variety of types, in which the scissor type dual-rotor engine is one of the relatively common types and comprises a carrier, a cylinder assembly installed on the carrier, a first and second rotor installed within the cylinder, a controller, and a transmission output mechanism for outputting power and so on. In such dual-rotor engine, each rotor is provided with a pair of sector pistons symmetrically, and the two rotors are installed on the same output shaft in such a way that two pairs of sector pistons are arranged crosswise to each other. Thus, the chamber inside the cylinder is divided into four operating chambers by means of the four sector pistons. Under the control of a rotor control mechanism, once the sector pistons rotate one cycle, each of the operating chambers does work four times in total, by which the efficiency can be enhanced substantially. Therefore, the rotor control mechanism plays a key role in the dual-rotor engine. Specifically, it is necessary for the rotor control mechanism to control the two pairs of sector pistons such that the rotation of the rotors can be stopped or started at precise positions in accordance with desired precise time sequences so as to prevent the rotors from counter-rotating. At the same time, the rotor control mechanism also needs to ensure the rotors being a precise operation state when the engine is started.

The structure of the controller in the conventional dual-rotors engine has a variety of types such as the step type, the differential type, the cam roller type and the ratchet spring capturing mechanism. None of the rotor control mechanisms such as the step type, the differential type and the cam roller type thereof enable the output shaft to rotate in a constant speed so that such mechanisms can not be used in practical applications. Moreover, the engine provided with a rotor reverse blocking device such as the ratchet spring capturing mechanism has a reliability approximate to zero. Therefore, none of the various kinds of conventional dual-rotor engines with different designs can be used in practical applications due to the fact that the controller can not precisely control the operating state when the rotors rotate.

SUMMARY OF THE PRESENT INVENTION

The object of the present invention is to provide a dual-rotor engine having a reliable operation to overcome the above-described drawbacks in the prior art.

In order to achieve the above-described object, the present invention provides the following technical solutions.

In one aspect, the present invention provides a dual-rotor engine comprising a cylinder assembly, a transmission output mechanism, a rotor control mechanism and a lubrication system. In the dual-rotor engine, the cylinder assembly comprises: a base; a tubular cylinder fixedly installed on the base; a front and rear end cover installed on the opposed ends of the tubular cylinder, each end cover being provided with a rotor journal aperture; a center supporting shaft passing through the tubular cylinder and rotatably installed on the base at two ends thereof; and a first and second rotor fixedly installed on the center supporting shaft, each of which comprises an inner cylindrical cylinder, a rotor journal integrated with the inner cylindrical cylinder and two sector pistons fixedly connected to the inner cylindrical cylinder symmetrically, two rotor journals protruding outward from the corresponding rotor journal aperture respectively, the two rotors having four sector pistons arranged crosswise to each other, both sides of each sector piston being provided with a recess respectively, adjacent recesses of two adjacent sector pistons defining a combustion chamber that has an indentation oriented towards the cylinder. In the dual-rotor engine, the transmission output mechanism comprises a transmission output shaft in parallel with the center supporting shaft; a first and second rotor gear installed on the two rotor journals; and a first and second driving gear installed on the transmission output shaft, wherein the first rotor gear can be engaged with the first driving gear, and the second rotor gear can be engaged with the second driving gear. Further, each of the first rotor gear and the second rotor gear may be provided with two toothless portions in a circumferential direction symmetrically, and the length and shape of the toothless portion are identical to those of the portion where the rotor gear can be engaged with the driving gear, so as to ensure that the operation of the first driving gear and the second driving gear will not be interfered when the first rotor gear and the second rotor gear are locked up; and two toothed segments of the first rotor gear and the second rotor gear have the same tooth number, and the tooth profiles at the beginning of the two toothed segments are identical so as to ensure the precision of the transmission.

The rotor control mechanism may be used for controlling intermittent rotation and stop of the two rotors and for controlling the rotating time and the stopping time, so as to ensure that the power can be outputted smoothly in a constant speed.

The sector piston may have a sector angle in a range from 35° to 45°.

The sector piston may have a sector angle of 40°.

In an embodiment of the present invention, each sector piston has a vibration and noise reduction surface on roots of two sides thereof close to the inner cylindrical cylinder, and two adjacent vibration and noise reduction surfaces can be contacted and engaged with each other.

A sealing may be provided between two inner cylindrical cylinders of the two rotors, and a sealing may be provided between the sector piston and the cylinder.

The combustion chamber may have an oval shape, one end of which is large and the other end of which is small.

The rotor gear may be a (cylindrical) spur gear.

The center supporting shaft may be in a shape of tubular, have a center conduit 96, and be provided with an injection hole 97 at a position where the rotor is installed. An aperture passage 94 may be provided within each of the two rotors, an oil outlet conduit 93 may be communicated with a cylinder wall, and a plurality of conduits are provided in the cylinder 6, the disk-shaped front end cover 5a and rear end cover 5b respectively, such that the center conduit, the aperture passages and the plurality of conduits can be communicated with each other.

The rotor gear may be a cylindrical helical gear. Each rotor gear may be provided with a convex ring, which protrudes outward from one end of the cylinder body of the rotor gear and has an outer circumference surface located on the root circle (or dedendum circle) of the rotor gear. Two positioning straight teeth for rotor gear, with tooth depth equal to that of the rotor gear, may be provided on the outer circumference surface of the convex ring centrosymmetrically, and may be disposed on the positions adjacent to two toothless portions respectively. The driving gear is provided with a convex ring, which protrudes outward from one end of the cylinder body of the driving gear and has an outer circumference surface located on the root circle of the driving gear. One positioning straight tooth for driving gear, with tooth depth equal to that of the driving gear, is provided on the convex ring of the driving gear. When the first rotor is in the timing unlocked state, one of the positioning straight teeth for rotor gear on the first rotor gear abuts against the positioning straight tooth for driving gear on the first driving gear, with the smallest angle between two adjacent positioning straight teeth for rotor gear on the first and second rotor gears being equal to the sector angle of the sector piston, and the installation angle between the two positioning straight teeth for driving gear on the two driving gears is 180°.

The rotor control mechanism may comprise a controller bracket fixedly installed with respect to the cylinder and provided with several pairs of pulleys, two sector control wheels, two brake journals and two reciprocating members, wherein the several pairs of pulleys are provided on the controller bracket. Both of the sector control wheels are installed on the transmission output shaft and are disposed on the outside of the two driving gears respectively, with an installation angle between the two sector control wheels being 180°. The sector control wheel comprises an inner cylindrical portion installed on the transmission output shaft, and a sector portion provided at the inner cylindrical portion and having an outer arced surface as an arced surface for pushing and supporting. The sector portion has a part extending outward from its rear surface to form a sector rearward-protruding wing, which has a thickness thinner than that of the sector portion. One surface of the sector rearward-protruding wing and one surface of the sector portion lie in the same plane, and another surface of the sector rearward-protruding wing is lower than another surface of the sector portion, such that a rearward-protruding wing indentation can be defined above the sector rearward-protruding wing for preventing rotation interference. The brake journal comprises an inner circle ring provided on and integrated with an end of the rotor journal and two brake bulges arranged symmetrically on the inner circle ring, wherein the angle ∠P between the diagonals of two brake bulges lying in the same plane is in a range from 10° to 50°; the upper and lower surfaces of the inner circle ring and the brake bulges lie in the same plane respectively, and a part of outer circumferential surface of the inner circle ring forms a C-shaped brake groove together with the side surfaces of the two brake bulges adjacent thereto. The reciprocating member comprises a body, a guide rail provided on the body and operated in cooperation with the pulleys located on the controller bracket, a C-shaped brake clamp provided on one side of the body and operated in cooperation with the C-shaped brake groove located on the rotor journal, and a rectangular block provided on the other side opposing to the one side of the body, wherein a timing unlocked boss for pushing is provided on the rectangular block, the bottom surface of the timing unlocked boss for pushing and the bottom surface of the rectangular block lie in the same plane, and the top surface of the timing unlocked boss for pushing is lower than that of the rectangular block, such that a rear timing indentation can be defined between the top surface of the timing unlocked boss for pushing and the rectangular block for preventing rotation interference. The lower outside of the timing unlocked boss for pushing is an inclined surface or arced surface, and the upper outside of the timing unlocked boss for pushing is an arced surface for pushing. The arced surface for pushing has a shape conformed to the shape of the arced surface for pushing and supporting of the sector control wheel, and the inclined surface and the arced surface for pushing extend to the outer surface of the rectangular block respectively.

The angle ∠P between the diagonals of the two brake bulges may be 40°.

The sector portion of the sector control wheel may have a portion extending outward from its rear surface to form a sector forward-protruding wing. A guide convex strip may be provided on the front end of the sector forward-protruding wing. The sector forward-protruding wing and the sector rearward-protruding wing may be provided on both sides of the sector portion and arranged in a staggered manner. The sector forward-protruding wing has a thickness thinner than that of the sector portion, wherein one surface of the sector forward-protruding wing and one surface of the sector portion lie in the same plane, and another surface of the sector forward-protruding wing is lower than another surface of the sector portion, such that a forward-protruding wing indentation can be defined between the sector forward-protruding wing and the sector portion for preventing rotation interference.

The body of the reciprocating element may be a rectangular plate, in which the C-shaped brake clamp may be fixed at one end of the rectangular block and the rectangular block may be fixed at the other end of the rectangular plate; both the C-shaped opening of the C-shaped brake clamp and the arced surface for pushing of the timing unlocked boss for pushing face towards the outer side.

The body of the reciprocating element is a rectangular frame, in which the C-shaped brake clamp and the rectangular block may be fixed at both widthwise sides of the rectangular frame, and both the C-shaped opening of the C-shaped brake clamp and the arced surface for pushing of the timing unlocked boss for pushing face towards the inner side.

In an embodiment of the present invention, the dual-rotor engine may further comprise a controller shaft installed in parallel with the transmission output shaft and a controller gear installed on the controller shaft, wherein one of the sector control wheels is installed on the controller shaft, the controller gear can be engaged with the corresponding one of the driving gears, and one of the reciprocating members is installed between the brake journal of the corresponding rotor and the sector control wheel.

The rotor control mechanism may comprise a controller bracket installed fixedly with respect to the cylinder and provided with several pairs of pulleys, two controller gear shafts arranged in parallel with the transmission output shaft, a first control gear and a first bowknot-shaped control wheel installed in the front of one of the controller gear shafts, a second control gear and a second bowknot-shaped control wheel installed in the rear of the other controller gear shaft, a reciprocating member controlled by the two bowknot-shaped control wheels to perform reciprocating movement, a first rotor control gear installed on the first rotor journal, and a second rotor control gear installed on the second rotor journal, wherein the first control gear can be engaged with the first rotor control gear, and the second control gear can be engaged with the second rotor control gear. The reciprocating member may be provided with two rectangular blocks and two timing unlocked bosses for pushing that are arranged centrosymmetrically, wherein the bottom surface of the timing unlocked boss for pushing and the rectangular block lie in the same plane, and the top surface of the timing unlocked boss for pushing is lower than the top surface of the rectangular block, such that a rear timing indentation can be defined between the top surface of the timing unlocked boss for pushing and the rectangular block for preventing rotation interference. The lower outside of the timing unlocked boss for pushing may be an inclined surface or arced surface, the upper outside of the timing unlocked boss for pushing may be an arced surface for pushing, and the inclined surface and the arced surface for pushing extend to the outside surface of the rectangular block respectively. The bowknot-shaped control wheel may be a rectangular body having two main surfaces, two lengthwise surfaces and two widthwise surfaces, wherein the angle $\angle P1$ between the diagonals on the main surface of the rectangular body may be in a range from 10° to 50°; each widthwise surface of the rectangular body can be an arced pushing surface conformed to the arced surface for pushing of the timing unlocked boss for pushing of the reciprocating member, and each lengthwise surface of the rectangular body may be composed of a planar surface connected with one of the arced pushing surfaces, an arced surface connected with the planar surface in a smooth transition and concaved into the rectangular body, and an inclined surface connecting the arced surface and the arced pushing surface. When the first bowknot-shaped control wheel is locked up, the inclined surface of the reciprocating member and the inclined surface of the first bowknot-shaped control wheel abut against each other, and the arced surface for pushing of the reciprocating frame and the arced surface of the first bowknot-shaped control wheel abut against each other.

The bowknot-shaped control wheel may further comprise two forward-protruding wings arranged centrosymmetrically, which are formed by extending the rectangular body of the bowknot-shaped control wheel outward from its inclined surface. The forward-protruding wing may have a thickness thinner than that of the rectangular body, wherein one surface of the forward-protruding wing and one main surface of the rectangular body lie in the same plane, and another surface of the forward-protruding wing is lower than another main surface of the rectangular body. A guide convex strip may be provided on the front end of the forward-protruding wing, and the forward-protruding wing and the rearward-protruding wing are provided on both sides of the lengthwise surfaces of the rectangular body respectively and arranged centrosymmetrically in a staggered manner.

The reciprocating member may be a rectangular frame, while the two rectangular blocks are the widthwise sides of the rectangular frame, and the arced surface for pushing of the timing unlocked boss for pushing may face towards the inside of the rectangular frame.

The reciprocating member may be a rectangular block, and the arced surface for pushing of the timing unlocked boss for pushing may face towards the outside of the rectangular frame.

In an embodiment of the present invention, the engine may be further provided with a rotor reverse blocking device comprising a camshaft in parallel with the transmission output shaft, a swing driven member and a spring, wherein a cam gear and a disc cam may be installed on the camshaft, and the cam gear can be engaged with the driving gear; the swing driven member may comprise a swing rod and a L-shaped erecting triangular end arranged at one end of the swing rod and operated in cooperation with the brake bulges of the brake journal, with the triangular end having a standup surface and an inclined surface; and the triangular end may be pressed against the brake bulges by the spring.

In an embodiment of the present invention, the engine may be further provided with a rotor reverse blocking device, wherein each sector piston of the rotors may have at least one radial hole, a triangular recess may be provided on the cylinder corresponding to each radial hole, and the rotor reverse blocking device comprises pins and springs disposed in the radial holes; wherein the tip of the pin has a triangular or wedge shape, and has a standup surface orientated towards the reverse-rotating direction of the rotors and an inclined surface or arced surface orientated towards the cylinder.

In an embodiment of the present invention, two weight counterbalances may be arranged symmetrically at the transmission output shaft or on the flywheel installed on the transmission output shaft.

In an embodiment of the present invention, at least one through hole may be drilled in the intake compression region of the cylinder or at the middle portion of a cylinder wall, and an intake relief valve may be installed in each of the through hole.

In an embodiment of the present invention, the engine may further comprise an electronic processor, which is used to receive and process the information on the operation condition of the vehicle, the ship or the machine in operation, the information on the operation condition of the engine, the fuel information, the intake or the intake supercharging information, the information on the compression ratio within the cylinder, so as to select the fuel, the compression ratio, the ignition manner and the operating manner of the supercharger, then convey these selected results to an actuating unit, such that the effect of the variable compression ratio can be improved.

In an embodiment of the present invention, the dual-rotor engine may be provided with a housing on the outside thereof, and the lubricant may be filled in the housing in order to lubricate and cool the rotor control mechanism and the transmission mechanism.

In an embodiment of the present invention, one inlet port and one outlet port may be provided on the cylinder; alternatively, another inlet port and another outlet port may be further provided on the cylinder, such that the cylinder has two inlet ports and two outlet ports that are spaced from each other and arranged centrosymmetrically.

The dual rotor engine of the present invention can obtain the following advantages and beneficial effects: with the two rotors and the rotor control mechanism and the transmission mechanism operating in cooperation with each other, the dual-rotor engine of the present invention can achieve the control to the operating state of the two rotors, in particular achieve the timing control of the rotors, and the power of the two rotors can be reliably accumulated to a single output shaft so as to output smoothly in a constant speed. Therefore, such an engine is indeed able to operate and possess practical applicability.

The above and other objects, features and advantages of the present invention will become more apparent from the following description of the preferable embodiments with reference to the accompanying drawings.

BRIEF DESCRIPTION OF DRAWINGS

FIG. 1-2 is a cross-section view of the cylinder assembly in the second position within the dual-rotor engine of the present invention;

FIG. 1-3 is a cross-section view of the cylinder assembly in the third position within the dual-rotor engine of the present invention;

FIG. 1-4 is a cross-section view of the cylinder assembly in the fourth position within the dual-rotor engine of the present invention;

FIG. 1-5 is a longitudinal section view of the cylinder assembly in the first position, depicting a sector piston of a first rotor;

FIG. 1-6 is a longitudinal section view of the cylinder assembly in the first position, depicting a sector piston of a second rotor;

FIG. 1-7 is a developed view of a cylinder of the cylinder assembly within the dual-rotor engine of the present invention;

FIG. 1-8 is a perspective view of a first rotor of the cylinder assembly within the dual-rotor engine of the present invention;

FIG. 1-9 is a front view of the first rotor illustrated in FIG. 1-8;

FIG. 1-10 is a left view of the first rotor illustrated in FIG. 1-8;

FIG. 1-11 is a right view of the first rotor illustrated in FIG. 1-8;

FIG. 1-12 is a cross-section view of a combustion chamber according to an embodiment taken along A2-A2 in FIG. 1-3, depicting the shape of the combustion chamber;

FIG. 1-13 is a cross-section view of a combustion chamber according to another embodiment taken along A2-A2 in FIG. 1-3, depicting the shape of the combustion chamber;

FIG. 2-1 depicts a structural schematic view of a transmission output mechanism within the dual-rotor engine of the present invention;

FIG. 2-2 is a perspective view of a first rotor gear within the dual-rotor engine of the present invention;

FIG. 2-3 is a front view of the first rotor gear illustrated in FIG. 2-2;

FIG. 2-4 depicts a structural schematic view of the design for the toothless portion of the first rotor gear;

FIG. 2-5 is a structural schematic view of a first driving gear within the dual-rotor engine of the present invention;

FIG. 2-6 depicts a structural schematic view of installation relationship between the first rotor gear and the first driving gear;

FIG. 2-7 depicts a structural schematic view of another kind of transmission output mechanism within the dual-rotor engine of the present invention;

FIG. 3-1 depicts a structural schematic view of the control mechanism according to the first embodiment within the dual-rotor engine of the present invention, depicting a state at the beginning of locking up;

FIG. 3-2 is a top view of FIG. 3-1;

FIG. 3-3 is a right view of FIG. 3-1;

FIG. 3-4 is a structural schematic view of the control mechanism according to the first embodiment within the dual-rotor engine of the present invention, depicting a state during locking up;

FIG. 3-5 is a structural schematic view of the control mechanism according to the first embodiment within the dual-rotor engine of the present invention, depicting a state at the beginning of unlocking;

FIG. 3-6 is a perspective view of a first sector control wheel;

FIG. 3-7 is a front view of the first sector control wheel illustrated in FIG. 3-6;

FIG. 3-8 is a perspective view of a first break journal in a control mechanism of the first embodiment;

FIG. 3-9 is a top view of FIG. 3-8;

FIG. 3-10 is a perspective view of a first reciprocating block in the control mechanism of the first embodiment;

FIG. 3-11 is a left view of the first reciprocating block in the control mechanism of the first embodiment illustrated in FIG. 3-10;

FIG. 3-12 is a right view of the first reciprocating block in the control mechanism of the first embodiment illustrated in FIG. 3-10;

FIG. 3-13 is a perspective view of the first reciprocating block with a timing boss for pushing;

FIG. 3-14 is a perspective view of the first sector control wheel with a sector forward-protruding wing;

FIG. 3-15 is a top view of the first sector control wheel with a sector forward-protruding wing illustrated in FIG. 3-14;

FIG. 3-16 is a right view of FIG. 3-15;

FIG. 4-1 is a structural schematic view of a control mechanism according to the second embodiment within the dual-rotor engine of the present invention;

FIG. 4-2 is a top view of FIG. 4-1;

FIG. 4-3 is a right view of FIG. 4-1;

FIG. 5-1 depicts a structural schematic view of a control mechanism according to the third embodiment within the dual-rotor engine of the present invention;

FIG. 5-2 is a top view of FIG. 5-1;

FIG. 5-3 is a right view of FIG. 5-1;

FIG. 5-4 depicts a structural schematic view of a control mechanism of the fourth embodiment within the dual-rotor engine of the present invention;

FIG. 6-1 is a structural schematic view of a control mechanism according to the fifth embodiment within the dual-rotor engine of the present invention, depicting a state during locking up;

FIG. 6-2 is a top view of FIG. 6-1;

FIG. 6-3 is a right view of FIG. 6-1;

FIG. 6-4 is a structural schematic view of the control mechanism according to the fifth embodiment within the dual-rotor engine of the present invention, depicting a state at the beginning of locking up;

FIG. 6-5 is a structural schematic view of the control mechanism according to the fifth embodiment within the dual-rotor engine of the present invention, depicting an unlocked state;

FIG. 6-6 depicts a perspective view of a reciprocating frame in the control mechanism according to the fifth embodiment within the dual-rotor engine of the present invention;

FIG. 6-7 is a front view of the reciprocating frame illustrated in FIG. 6-6;

FIG. 6-8 depicts a perspective view of the reciprocating frame with a forward-protruding wing in the control mechanism according to the fifth embodiment within the dual-rotor engine of the present invention;

FIG. 6-9 depicts a perspective view of a first bowknot-shaped control wheel in the control mechanism according to the fifth embodiment within the dual-rotor engine of the present invention;

FIG. 6-10 is a top view of the first bowknot-shaped control wheel illustrated in FIG. 6-9;

FIG. 6-11 depicts a perspective view of the first bowknot-shaped control wheel with a forward-protruding wing in the control mechanism according to the fifth embodiment within the dual-rotor engine of the present invention;

FIG. 6-12 is a left view of the first bowknot-shaped control wheel with a forward-protruding wing illustrated in FIG. 6-11;

FIG. 6-13 is a front view depicting that the reciprocating frame with the forward-protruding wing illustrated in FIG. 6-8 fits with the first bowknot-shaped control wheel with the forward-protruding wing illustrated FIG. 6-12;

FIG. 6-14 is a schematic view depicting each sector angle as well as angular position and radius of each arced surface for a first bowknot-shaped control wheel;

FIG. 7-1 is a structural schematic view depicting a rotor control mechanism according to the sixth embodiment within the dual-rotor engine of the present invention;

FIG. 7-2 is a top view of FIG. 7-1;

FIG. 7-3 is a right view of FIG. 7-1;

FIG. 7-4 depicts a perspective view of a reciprocating block in the control mechanism according to the sixth embodiment within the dual-rotor engine of the present invention;

FIG. 7-5 depicts a perspective view of a reciprocating block with a forward-protruding wing in the rotor control mechanism according to the sixth embodiment within the dual-rotor engine of the present invention;

FIG. 8 is a cross-section view taken along A1-A1 in FIG. 1-1, depicting a structural schematic view of a lubrication system within the dual-rotor engine of the present invention;

FIG. 9-1 is a schematic view depicting a sealing structure of a rotor within the dual-rotor engine of the present invention;

FIG. 9-2 is a schematic view depicting another sealing structure of a rotor within the dual-rotor engine of the present invention;

FIG. 9-3 is a top view of the sector piston in FIG. 9-1;

FIG. 9-4 is an enlarged view of portion G in FIG. 1-5;

FIG. 9-5 is a structural schematic view of an O-type sealing ring illustrated in FIG. 1-5;

FIG. 10-1 depicts a structural schematic view of a first step in a process of controlling a rotor reverse blocking device according to the present invention;

FIG. 10-2 depicts a structural schematic view of a second step in the process of controlling the rotor reverse blocking device according to the present invention;

FIG. 10-3 depicts a structural schematic view of another rotor reverse blocking device in the present invention;

FIG. 11-1 depicts a structural schematic view of a weight counterbalance (or balance weight) arranged on a transmission output shaft;

FIG. 11-2 depicts a structural schematic view of two weight counterbalances symmetrically arranged on a flywheel;

FIG. 12-1 depicts a structural schematic view achieving a variable compression ratio in the present invention;

FIG. 12-2 is an electric control principle view for achieving a variable compression ratio;

FIG. 13 depicts a structural schematic view of the dual-rotor engine of the present invention with a housing on the outside thereof; and FIG. 14 depicts a structural schematic view that the dual-rotor engine of the present invention can be slightly modified into a compressor or a pump.

DETAILED DESCRIPTION OF PREFERRED EMBODIMENTS

Figure 1:
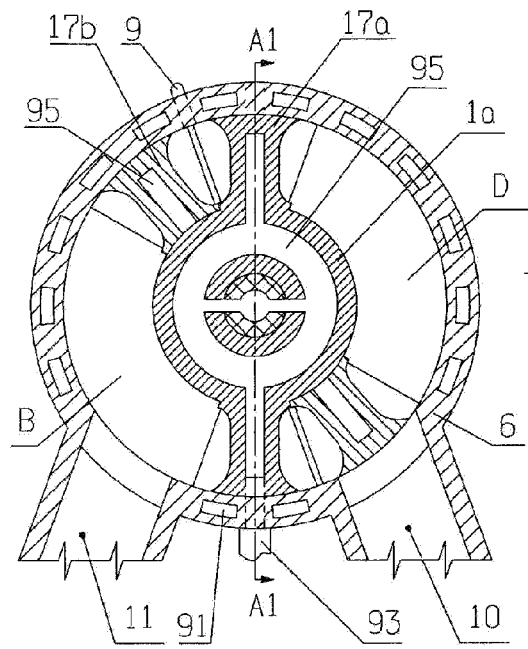
FIG. 1-1 is a cross-section view of a cylinder assembly in the first position within the dual-rotor engine of the present invention.

Hereinafter, the exemplary embodiments of the present invention will be described in detail. It should be noted that the embodiments described herein are merely used for illustration, but not intend to restrict the present invention.

The dual-rotor engine of the present invention comprises a cylinder assembly, a transmission output mechanism, a rotor control mechanism and a lubrication system.

With reference to FIG. 1-1 to FIG. 1-11, the cylinder assembly of the dual-rotor engine according to the present invention comprises a tubular cylinder 6 fixedly connected on or integrated with a base (not shown), a center supporting shaft 7 passing through the tubular cylinder 6 and connected to the base by bearings at two ends thereof, a first rotor 1a and a second rotor 1b. The tubular cylinder 6 is provided with a spark plug 9 on an upper left side thereof; and under the tubular cylinder 6, there are an inlet port 10 and an outlet port 11 connected to the tubular cylinder 6 respectively. In the dual-rotor engine of the present invention, the intake and exhaust of gas can be performed along a radial direction, and also can be performed along a circumferential direction. A disk-shaped front end cover 5a and rear end cover 5b are fixedly connected to a front and rear end of the tubular cylinder 6, respectively. Gaskets are provided between the front and rear end covers and the tubular cylinder 6 so as to ensure the sealing performance of the tubular cylinder 6. Each of the front and rear end covers 5a, 5b is provided with a rotor journal aperture in the center thereof.

The first rotor 1a comprises an inner cylindrical cylinder 99a (see FIG. 1-8), a first rotor journal 20a connected to and integrated with an end of the inner cylindrical cylinder 99a, and two first sector pistons 17a fixedly connected on the inner cylindrical cylinder 99a symmetrically. A sector angle for the first sector piston 17a on the first rotor is preferably between 35° and 45°, and optimally 40°. If the sector angle is less than 35°, the thickness of the rotor is too thin, such that the volume of the combustion chamber, the force exerted to the rotor, the temperature and the sealing performance can be influenced significantly. The diameter of the first rotor journal 20a is smaller than the diameter of the inner cylindrical cylinder 99a. The first sector piston 17a has a protruding portion protruding from the inner cylindrical cylinder 99a, and the protruding portion of the first sector piston 17a and the first rotor journal 20a are located at the opposite ends of the inner cylindrical cylinder 99a respectively. An annular groove 19a is provided at the end of the inner cylindrical cylinder 99a that is not connected with the first rotor journal 20a, and is located in close proximity to a circumference of the bottom surface of the inner cylindrical cylinder 99a, so as to reduce the longitudinal sealing depth. At the position where the first rotor journal 20a is connected to the inner cylindrical cylinder 99a, a sealing groove is provided on the circumference of the inner cylindrical cylinder 99a. In addition to the position where the first sector piston 17a is jointed to the inner cylindrical cylinder 99a, two sealing grooves surrounding about the first sector piston 17a are arranged in parallel. At the center axis of the first rotor 1a, a center supporting shaft bore 21a is provided to fit with the center supporting shaft 7. Two recesses 15a concaved towards the first sector piston 17a are provided on two symmetry side surfaces of the first sector piston 17a, respectively. On both side surfaces of the first sector piston 17a, there are vibration and noise reduction surfaces 14a at the root of the first sector piston 17a close to the inner cylindrical cylinder 99a.

The structure of the second rotor 1b is identical to that of the first rotor 1a, and comprises an inner cylindrical cylinder 99b, a second rotor journal 20b (see FIG. 1-5) connected to and integrated with an end of the inner cylindrical cylinder, and two second sector pistons 17b fixedly connected on the inner cylindrical cylinder symmetrically. A center supporting shaft bore is provided at a center axis of the second rotor 1b. Two recesses concaved towards the second sector piston 17b are provided on two symmetry side surfaces of the second sector piston 17b, respectively. On both side surfaces of the second sector piston 17b, there are vibration and noise reduction surfaces 14a at the root of the second sector piston 17b in proximity to the inner cylindrical cylinder. Sealing grooves are provided on the inner cylindrical cylinder 99a and the first sector piston 17a.

The first rotor 1a and the second rotor 1b are fixedly mounted onto the center supporting shaft 7 through respective center supporting shaft bores. The first rotor 1a and the second rotor 1b both function in the same way in the engine, but work in different operating conditions at the same moment. The first rotor 1a and the second rotor 1b are installed on the center supporting shaft 7 in opposite directions, such that the inner cylindrical cylinder 99a of the first rotor 1a and the inner cylindrical cylinder 99b of the second rotor 1b are located inside of the cylinder 6, and the rotor journals of both rotors protrude to the outside of the cylinder 6 from the rotor journal apertures of the front end cover 5a and the rear end cover 5b respectively. The sector piston 17a of the first rotor 1a and the sector piston 17b of the second rotor 1b are located inside the cylinder 6 and arranged crosswise to each other. An annular sealing groove 19a for reducing the longitudinal sealing depth is provided on each of the contact surfaces between the inner cylindrical cylinder 99a of the first rotor 1a and the inner cylindrical cylinder 99b of the second rotor 1b, and the annular sealing grooves 19a are aligned with each other to enable an O-type sealing ring to be embedded therein, thereby airtightness on the longitudinal contact surfaces of the two rotors can be achieved. A combustion chamber 15 is formed of two recesses on the adjacent side surfaces of the adjacent first and second sector pistons 17a and 17b, and is provided with an indentation at a position of the combustion chamber 15 facing towards the spark plug 9 or an oil injection port. Air is stored in the corresponding combustion chamber 15 after being compressed, and the volume ratio of the combustion chamber 15 to the intake operation chamber is equal to the compression ratio of the engine. The combustion chamber preferably has an oval shape in a cross-section perpendicular to the axis, one end of which is large and the other end of which is small, i.e., the portion close to the indentation has a larger volume and the portion close to the center supporting shaft 7 has a relatively smaller volume. As illustrated in FIG. 1-12 and FIG. 1-13, the recesses of the combustion chamber 15 may be arranged symmetrically in a plane in parallel with the axis. However, the deepest portion of the recesses of the combustion chamber 15 may be arranged asymmetrically, and may be offset at the position close to the inner cylindrical cylinder of the rotor so as to improve the loading condition of the rotor. The two vibration and noise reduction surfaces on the root of two adjacent sector pistons of two rotors installed on the center supporting shaft 7 are contacted and fitted with each other, so as to reduce the vibration and noise generated from collision therebetween during the operation of the rotors. As being in proximity to the center supporting shaft 7 gradually, the angular velocity of rotation will be decreased. Thus, the vibration and noise can be sufficiently reduced by the vibration and noise reduction surfaces.

With reference to FIG. 1-1, FIG. 1-2, FIG. 1-3 and FIG. 1-4, A indicates a power stroke, B indicates an exhaust stroke, C indicates an intake stroke, and D indicates a compression stroke. The sector angles for the sector pistons of the first rotor and the second rotor can be set to 40 degree, and the angle corresponding to the power stroke can be set to 100 degree.

The process of the power stroke of the dual-rotor engine of the invention will be described as follows:

FIG. 1-1 depicts the view of the dual-rotor engine of the invention, in which the engine starts to do work. At this time, the first rotor 1a is locked up to the cylinder 6 by the control mechanism (in the vertical position in FIG. 1-1), and the second rotor 1b can be rotated freely. One pair of the adjacent first and second sector pistons 17a and 17b of the first rotor 1a and the second rotor 1b abut against each other to divide the cavity of the cylinder 6 into two operation chambers, which correspond two strokes at an initiation stage, i.e., the exhaust stroke B and the compression stroke D. The combustion chamber 15 formed between the first sector piston 17a and the second sector piston 17b is directly towards the spark plug 9 on the cylinder 6.

With reference to FIG. 1-2, FIG. 1-3 and FIG. 1-4, when the spark plug 9 is ignited, the compressed air containing fuel inside the combustion chamber 15 expands to urge the second rotor 1b to rotate freely and do work, and the work done by the second rotor 1b can be outputted by the transmission mechanism. During the second rotor 1b doing work, the second sector piston 17b is separated from the first sector piston 17a to divide the cavity of the cylinder 6 into four operation chambers, which correspond to four strokes, i.e., the power stroke A, the exhaust stroke B, the intake stroke C and the compression stroke D. Air is sucked via the inlet port 10 and the exhaust gas is discharged from the outlet port 11. The rotation angle corresponding to the power stroke of the second rotor 1b is 100 degree. When the second rotor 1b rotates such that the second sector piston 17b thereof is tightly contacted with the first sector piston 17a of the first piston 1a, the control mechanism controls the first rotor 1a to be unlocked, and the first rotor 1a and the second rotor 1b are rotated 40 degree together under the action of the inertia and the flywheel; at this point, the second rotor 1b reaches to the vertical position in place of the initial position of the first rotor 1a. At this time, the second rotor 1b is locked up to the cylinder 6 by the control mechanism, and the first rotor 1a can be rotated freely. The other pair of the adjacent first and second sector pistons 17a and 17b of the first rotor 1a and the second rotor 1b abut against each other, and the combustion chamber 15 formed between this pair of the first sector piston 17a and the second piston 17b is directly towards the spark plug 9 on the cylinder 6. When the spark plug 9 is ignited, the above-described process of power stroke will be repeated and circulated in endless cycles in such way.

Figures 1, 2, 3:
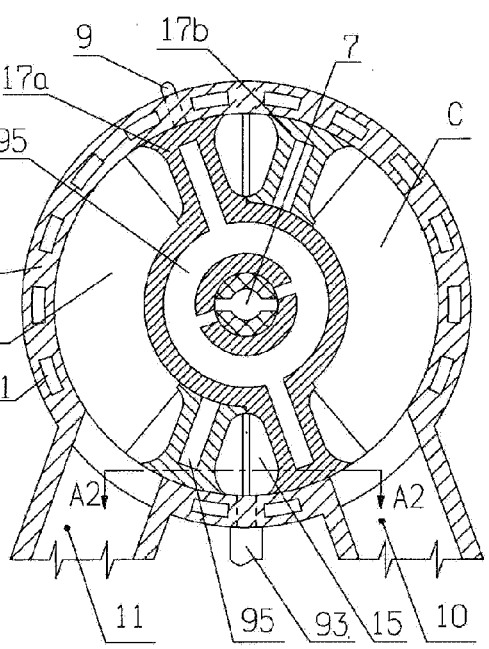
Figures 1, 2:
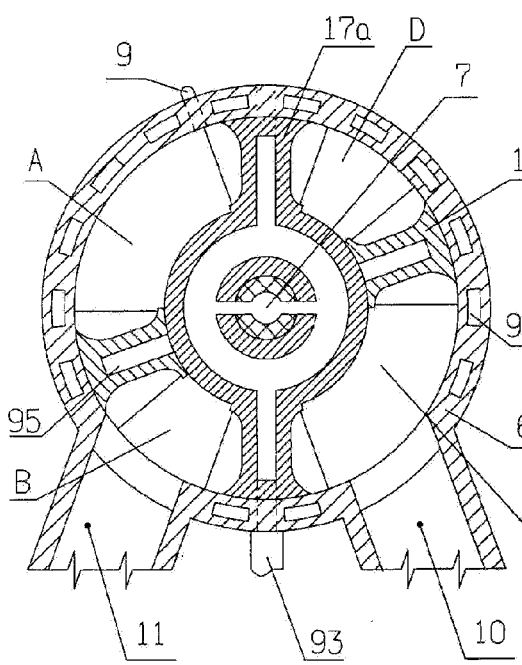

With reference to FIG. 2-1, the transmission output mechanism of the present invention comprises a transmission output shaft 8, a first rotor gear 2a, a first driving gear 3a, a second rotor gear 2b and a second driving gear 3b. In the transmission output mechanism, the transmission output shaft 8 is disposed outside the cylinder 6 and in parallel with the center supporting shaft 7, and two ends of the transmission output shaft 8 are rotatably installed on the base by means of bearings respectively. Alternatively, the two ends of the transmission output shaft 8 also can be fixedly installed on the base directly.

The first rotor gear 2a is a cylindrical helical gear, which is put onto the rotor journal of the first rotor and fixedly connected thereon with a spline and a keyway.

The second rotor gear 2b is a cylindrical helical gear, which is put onto the rotor journal of the second rotor and fixedly connected thereon with a spline and a keyway.

The first driving gear 3a and the second driving gear 3b are fixedly connected on the transmission output shaft 8 by means of a spline and a keyway, respectively. The first driving gear 3a can be engaged with the first rotor gear 2a, and the second driving gear 3b can be engaged with the second rotor gear 2b.

Figures 1, 2, 3, 4:
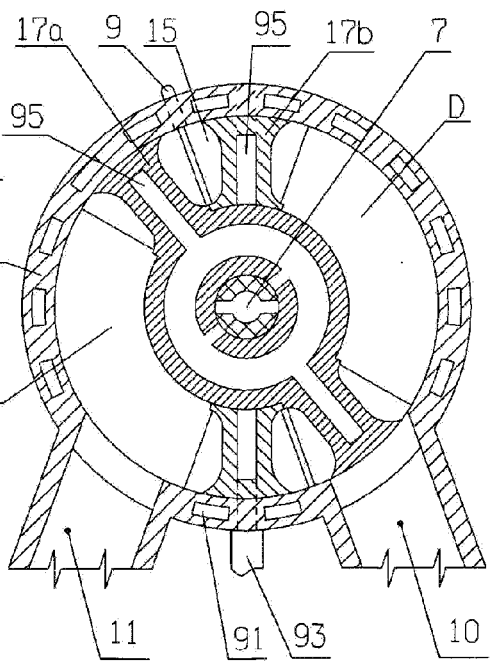

With reference to FIG. 2-4, there is a strict requirement on the perimeters of the first rotor gear 2a and the first driving gear 3a as follows. Assuming that the rotor gear be considered as 360°, the perimeter of the first driving gear 3a equals the sum of a half of the perimeter of the rotor gear and the arc length of the first rotor gear 2a corresponding to the rotation angle for doing work. Alternatively, the perimeter of the first driving gear 3a equals the arc length of the first rotor gear 2a corresponding to the difference between 360° and the angle occupied by the two sector pistons of the first rotor gear 2a. The same result can be obtained from these two calculation methods.

With reference to FIG. 2-2, FIG. 2-3, FIG. 2-4 and FIG. 2-5, the first rotor gear 2a of the invention has an addendum circle 281 and a root circle 271. The first driving gear 3a has an addendum circle 282 and a root circle 272. The addendum circle 281 of the first rotor gear 2a and the addendum circle 282 of the first driving gear 3a that are engaged with each other have two intersection points 251, 252. Two diameter lines $d_1$, $d_2$ drawn by passing through these two intersection points 251, 252 and a circle center $O_1$ of the first rotor gear 2a have two intersection points 253, 254 on the addendum circle 281 of the first rotor gear 2a, respectively. These four intersection points divide the addendum circle 282 into four arcs. The arc lengths of two arcs arranged symmetrically, i.e., the arc between the intersection points 251, 252 and the arc between the intersection points 253, 254, correspond to the arc length of the toothless portion 24 on the first rotor gear 2a; and the arc lengths of the other two arcs arranged symmetrically, i.e., the arc between the intersection points 251, 253 and that between the intersection points 252, 254, corresponds to the arc length of the tooth portion on the first rotor gear 2a. The two toothed arc segments have the same tooth profile at the initial position, the meshing position of the rotor gear and the driving gear is stabile, and the teeth on the rotor gear and the driving gear to be engaged with each other present one-to-one correspondence relationship. The toothless portion 24 corresponds to the portion where the first rotor gear 2a is engaged with the first driving gear 3a. The shape of the toothless portion 24 is defined by the region surrounded by the addendum circles 281, 282 of the first rotor gear 2a and the first driving gear 3a in the case where the first rotor gear 2a is engaged with the first driving gear 3a, as shown in the hatching portion of FIG. 2-4. The toothless portion 24 is designed to ensure that the rotation of the driving gear can not be disturbed by the rotor gear when the rotor gear is needed to stop rotating but the driving gear is needed to rotate. The toothless portion of the rotor gear is directly towards the driving gear when the rotor gear stops rotating, so that the rotation of the driving gear can not be disturbed by the rotor gear. Taking consideration of the factors such as tooth depth, tooth thickness, tooth gap and the like of the rotor gear and driving gear, the length and height of the toothless portion of the rotor gear can be slightly longer or larger than the above-described distances, the height of the toothless portion of the rotor gear is designed to meet the principle that the rotation of the driving gear will not be interfered when the rotor gear stops rotating.

The first rotor gear 2a is provided with a convex ring 26 protruding outward from an end of the cylindrical body thereof. The outer circumferential surface of this convex ring 26 is located at the root circle of the first rotor gear 2a, and is symmetrically provided with two positioning straight teeth 50 for rotor gear, with its tooth depth being equal to the tooth depth of the first rotor gear 2a. The two positioning straight teeth 50 for rotor gear are arranged centrosymmetrically and located adjacent to the two toothless portions respectively. Assuming the rotation direction as a frontward direction, the positioning straight teeth 50 for rotor gear are located at the rear of the toothless portion 24 of the rotor gear and are immediately proximate to the toothless portion 24. It should be noted that it is unnecessary to design the convex ring and the positioning straight teeth, in the case where the rotor gear and the driving gear achieve the transmission by straight teeth.

Since the second rotor gear 2b of the invention is identical to the first rotor gear 2a, the details thereof will be omitted.

In the present invention, the driving gear to be engaged with the rotor gear may be an intact cylindrical helical gear without a toothless portion; the driving gear also can be provided with a toothless portion. The two toothed arc segments of the first rotor gear 2a, i.e., the arc segment between the intersection points 251, 253 and the arc segment between the intersection points 252, 254, have the completely same tooth profile at the initial positions of the arcs. The toothed arc segment of the first rotor gear 2a can be engaged to an arc segment of the driving gear which is always located at a fixed position on the driving gear. If the portion of the driving gear not participating in meshing is interfered with the portion participating in meshing with regard to the design of tooth profile, the former portion can also be designed as a toothless structure.

As illustrated in FIG. 2-5 and FIG. 2-6, the first driving gear 3a of the invention is provided with a convex ring 44 protruding outward from an end of the cylindrical body thereof, the outer circumferential surface of this convex ring 44 is located at the root circle of the first driving gear 3a, and the convex ring 44 is provided with one positioning straight tooth 51 for driving gear, with a tooth depth equal to the tooth depth of the first driving gear 3a. After the first rotor gear 2a and the first driving gear 3a are installed on the center supporting shaft 7 and the transmission output shaft 8 respectively, when the rotor control mechanism of the first rotor 1a is set to in a timing unlocked state, one of the positioning straight teeth 50 for rotor gear of the first rotor gear 2a will abut against the positioning straight tooth 51 for driving gear of the first driving gear 3a. When the first rotor gear 2a starts to rotate, the positioning straight teeth 50 for rotor gear will be obstructed by the positioning straight tooth 51 for driving gear of the first driving gear 3a, such that the first rotor gear 2a can not further rotate, so as to ensure that the teeth of the rotor gear and the driving gear to be engaged with each other present one-to-one correspondence relationship, and a misalignment phenomenon will not be occurred. The need for disposing the positioning straight teeth 50 for rotor gear and the positioning straight tooth 51 for driving gear can be eliminated, when the driving gear employs a spur gear.

Since the second driving gear 3b of the invention is identical to the first driving gear 3a, the details will not be repeated any more.

The adjacent first and second sector pistons 17a, 17b of the first rotor 1a and the second rotor 1b will abut against each other, when the rotor control mechanism of the first rotor 1a is set to in the timing unlocked state; at this time, the minimum angle between the positioning straight teeth 50 for rotor gear of the second rotor gear 2b and the positioning straight teeth 50 for rotor gear of the first rotor gear 2a is equal to the sector angle of one sector piston.

The installation angle difference between the positioning straight tooth 51 for driving gear of the first driving gear 3a and the positioning straight tooth 51 for driving gear of the second driving gear 3b is 180°. The angle between the positioning straight teeth 50 for rotor gear of the first rotor gear 2a and the positioning straight teeth 50 for rotor gear of the second rotor gear 2b is varied continuously due to their rotating and stopping-rotation.

Hereinafter, the process of outputting power by two rotors in the present invention will be described as follows. At the moment that the first rotor 1a is unlocked by the controller, the first rotor 1a will be urged to rotate over an angle by the second rotor 1b, in which the angle urged to rotate is equal to the sector angle of one sector piston. Then, the first rotor 1a rotates to drive the first rotor gear 2a fixed on the first rotor journal 20a to rotate, and thus the first rotor gear 2a will be engaged with the first driving gear 3a to rotate together. After the first rotor 1a rotates by the sector angle of one sector piston, the combustion chamber 15 is defined between the adjacent first and second sector pistons 17a, 17b, and the compressed air contained fuel within the combustion chamber 15 is ignited or compression-ignited. The first rotor 1a starts to do work, and rotates to continue driving the first rotor gear 2a fixed thereon to rotate, then the first rotor gear 2a drives the first driving gear 3a engaged therewith to rotate, whereby the transmission output shaft 8 fixedly connected with the first driving gear 3a will be urged to rotate, so that the power output can be achieved. At the moment that the process of the first rotor 1a for doing work is completed, also the moment that the locking-up to the second rotor 1b is released by controller, the second rotor 1b is urged to rotate over an angle by the first rotor 1a, in which the angle urged to rotate is equal to the sector angle of one sector piston. Then, the second rotor 1b rotates to drive the second rotor gear 2b fixed thereon to rotate, and thus the second rotor gear 2b is engaged with the second driving gear 3b to rotate together. After the second rotor 1b is rotates by the sector angle of one sector piston, the combustion chamber 15 is defined between the adjacent second and first sector pistons 17b, 17a, and the compressed air contained fuel in the combustion chamber 15 is ignited or compression-ignited. The second rotor 1b starts to do work, and goes on driving the second rotor gear 2b fixed thereon to rotate, then the second rotor gear 2b drives the second driving gear 3b engaged therewith to rotate, and the second driving gear 3b drives the transmission output shaft 8 fixedly connected therewith to rotate, so that the power output is achieved. Therefore, in the present invention, the power outputted by the sequent rotation of the first rotor 1a and the second rotor 1b can be accumulated on the same transmission output shaft 8.

As illustrated in FIG. 2-7, in the transmission output mechanism of the present invention, a first transmission inter-wheel 16a can be further installed on the center supporting shaft 7 between the first rotor gear 2a and the first cylinder cover 5a, and a second transmission inter-wheel 16b can be further installed on the center supporting shaft 7 between the second rotor gear 2b and the second cylinder cover 5b. The first transmission inter-wheel 16a and the second transmission inter-wheel 16b both are intact gears, are only used in the controller for driving the rotor gear, and are engaged with the first controller gear 30a and the second controller gear 30b respectively.

With the present invention, the worldwide problem that the power of the dual-rotor engine can not be accumulated on one single shaft with high reliability has been solved for the first time. With the design of toothless in the certain position of the rotor gear and the design of the positioning straight teeth for preventing the rotor gear from overdriving (the rotor gear will never have the possibility of being hysteretic), the problem of meshing and matching between the rotor gear and the driving gear can be perfectly solved, thereby one-to-one engagement with high accuracy can be achieved, and the phenomena that the teeth are broken and staggered does not occur. Meanwhile, such an engagement with high accuracy has an effect of positioning accurately with regard to rotation angle of rotor. The rotor gear and the driving gear are enclosed inside the housing and immerged into lubricant, so that both of the wear and temperature will be reduced and the gear lifetime can be considerably prolonged.

As illustrated in FIG. 3-1, FIG. 3-2 and FIG. 3-3, the rotor control mechanism in the first embodiment of the present invention comprises a controller bracket 32 fixedly installed with respect to the cylinder 6, a first sector control wheel 64a, a second sector control wheel 64b, a first brake journal 66a, a second brake journal 66b, a first reciprocating block 65a and a second reciprocating block 65b. Several pairs of pulleys 34 are installed on the controller bracket 32.

The first sector control wheel 64a is installed on the transmission output shaft 8 and located outside of the first driving gear 3a, while the second sector control wheel 64b is installed on the transmission output 8 and located outside of the second driving gear 3b. The angle between the center line of the first sector control wheel 64a and the center line of the second sector control wheel 64b is 180° after they both are installed on the transmission output shaft 8.

As illustrated in FIG. 3-6 and FIG. 3-7, the first sector control wheel 64a comprises a first inner cylindrical portion 71 installed on the transmission output shaft 8 and a sector portion provided at the first inner cylindrical portion 71. The outer arced surface of the sector portion is an arced surface for pushing and supporting 69, and the intersection line between the front side surface of the sector portion (i.e. the side surface on the front during the rotation moment) and the arced surface for pushing and supporting 69 is a pushing edge line 70; a part of the sector portion extends outward from its rear side surface (i.e. the side surface on the rear during the rotational movement) to form a sector rearward-protruding wing 691. The intersection line between the arced surface for pushing and supporting 69 of the sector rearward-protruding wing 691 and its rear side surface is an unlocked control line 692. The sector rearward-protruding wing 691 has a thickness thinner than that of the sector portion, wherein one surface of the sector rearward-protruding wing 691 and one surface of the sector portion lie in the same plane, and another surface of the sector rearward-protruding wing 691 is lower than another surface of the sector portion, so that a rearward-protruding wing indentation 68 is defined above the sector rearward-protruding wing 691. The sector angle N of the sector rearward-protruding wing 691 is sized to be typically between 30° and 50°, such that the sector rearward-protruding wing 691 will not be blocked by the first sector control wheel 64a when it urges the reciprocating lever to move. Furthermore, the size of this angle can be varied slightly as the desired design. The sector angle $\angle M$ of the first sector control wheel 64a, i.e. the sum of the sector angle of the sector portion and the sector angle $\angle N$ of the sector rearward-protruding wing 691, can be calculated by the formula "the angle produced by the rotor doing work÷(the angle produced by the rotor doing work+180°)×360°−$\angle L$", in which $\angle L$ is the sector angle of the sector forward-protruding wing (see the following description). $\angle L$ is approximate to 30°, and the purpose for subtracting $\angle L$ in this formula is also to prevent the sector rearward-protruding wing from blocking by the first sector control wheel 64a when it urges the reciprocating lever to move. On the basis of the above-described principle, the size of the angle $\angle L$ can be varied slightly as desired, and thereby the size of the sector angle $\angle M$ of the first sector control wheel 64a can be correspondingly varied slightly.

As Example 1, if the sector angle of the sector piston of the rotor is set to 40°, the angle produced by the rotor doing work is: 180°−40°×2=100°. The perimeter of the driving gear is merely equal to the perimeter of the rotor gear corresponding to 280°. The sector angle M of the sector control wheel 64 can be calculated as follows: M=100°÷(100°+180°)×360°−30°≈98.5714°. Therefore, the sector angle M of the sector control wheel 64 is equal to 98.5714°.

As Example 2, if the sector angle of the sector piston of the rotor is set to 45°, the angle produced by the rotor doing work is: 180°−45°×2=90°. The perimeter of the driving gear is merely equal to the perimeter of the rotor gear corresponding to 270°. The sector angle M of the sector control wheel 64 can be calculated as follows: M=90°÷(90°+180°)×360°−30°=90°. Therefore, the sector angle M of the sector control wheel 64 is equal to 90°.

As illustrated in FIG. 3-8 and FIG. 3-9, the first brake journal 66a comprises an inner circle ring 661 provided on and integrated with the end of the first rotor journal 20a and two brake bulges 662 arranged symmetrically on the inner circle ring 661, wherein the upper and lower surfaces of the inner circle ring 661 and brake bulges 662 lie in the same plane respectively. A portion of outer circumferential surface of the inner circle ring 661 forms a C-shaped brake groove 76 together with the sides of the two brake bulges 662 adjacent thereto. As illustrated in FIG. 3-9, the angle ∠P between two diagonals of the two brake bulges 662 is 40° but not restricted to 40°. It is possible that the angle ∠P is less than 50°. Generally, the angle ∠P may be in the range from 10° to 50°. In the machining and manufacturing, a part of arc-shaped portion can be symmetrically cut out from the end of the first rotor journal 20a protruding beyond the first rotor gear 2a, so as to form the two C-shaped brake grooves 76, and thus to form the first brake journal 66a.

As illustrated in FIG. 3-10, the first reciprocating block 65a comprises a rectangular plate, a C-shaped brake clamp 67 provided on one end of the rectangular plate and being capable of operating in cooperation with the C-shaped brake groove 76 on the first rotor journal 20a, and a rectangular block 671 provided on and being perpendicular to the other end of the rectangular plate. The upper and lower surfaces of the rectangular plate are provided with a guide rail 35 in cooperation with the pulleys 34 on the controller bracket 32, respectively. At the front of the rectangular block 671, a timing unlocked boss for pushing (or lifting) 42 is arranged on its lower portion, the bottom surface of the timing unlocked boss for pushing 42 and the rectangular block 671 lie in the same plane, and the top surface of the timing unlocked boss for pushing 42 is lower than that of the rectangular block 671 so that a rear timing indentation 43 is defined between the top surface of the timing unlocked boss for pushing 42 and the rectangular block 671. An inclined surface 421 is located at the lower outside of the timing unlocked boss for pushing 42, while an arced surface for pushing 422 is located at the upper outside of the timing unlocked boss for pushing 42. The arced surface for pushing 422 has a shape conformed to the arced surface for pushing and supporting 69 of the first sector control wheel 64a. The inclined surface 421 and the arced surface for pushing 422 extend to the outside surface of the rectangular block 671 respectively. The intersection line between the inclined surface 421 and the arced surface for pushing 422 is a lock-up line 420. The intersection line between the arced surface for pushing 422 and the top surface of the timing unlocked boss for pushing 42 is a release line 423.

The second reciprocating block 65b has the same construction as that of the first reciprocating block 65a, so that the details thereof will not be described any more.

The first reciprocating block 65b, which is located between the first brake journal 66a and first sector control wheel 64a of the first rotor gear 2a, can be controlled by the first sector control wheel 64a to perform the reciprocating linear movement periodically, so that the first rotor gear 2a can be controlled to rotate and stop periodically.

As illustrated in FIG. 3-1, FIG. 3-4 and FIG. 3-5, in the first embodiment of the present invention, the working process of the control mechanism for controlling the first rotor gear 2a to rotate/stop will be described as follows.

Figures 1, 2, 3, 4, 5, 6, 7:
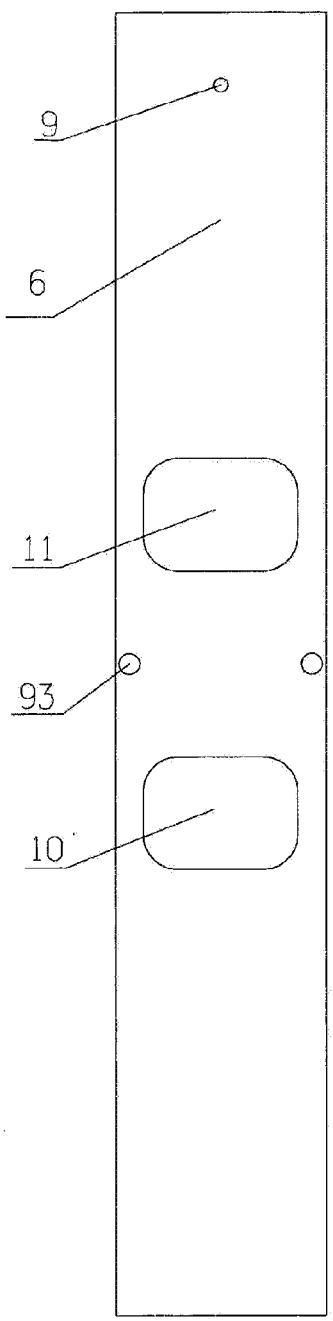
Figures 1, 2, 3, 4, 5:
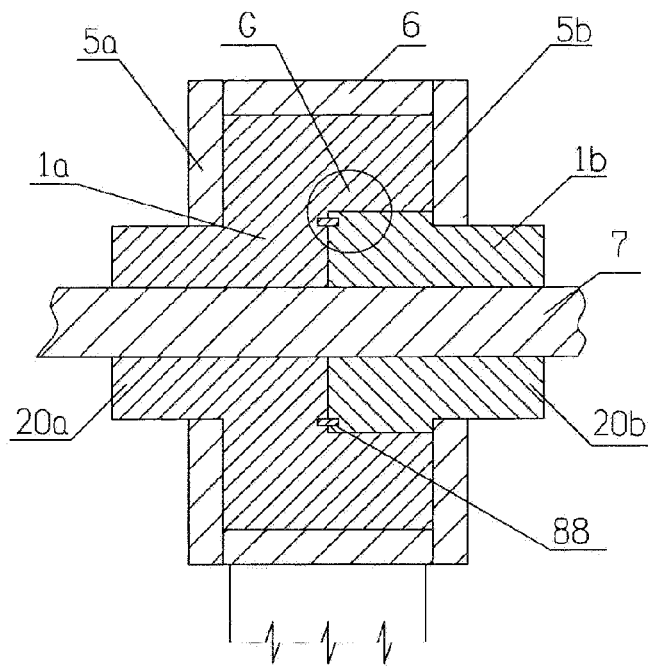
Figures 1, 2, 3, 4, 5, 6:
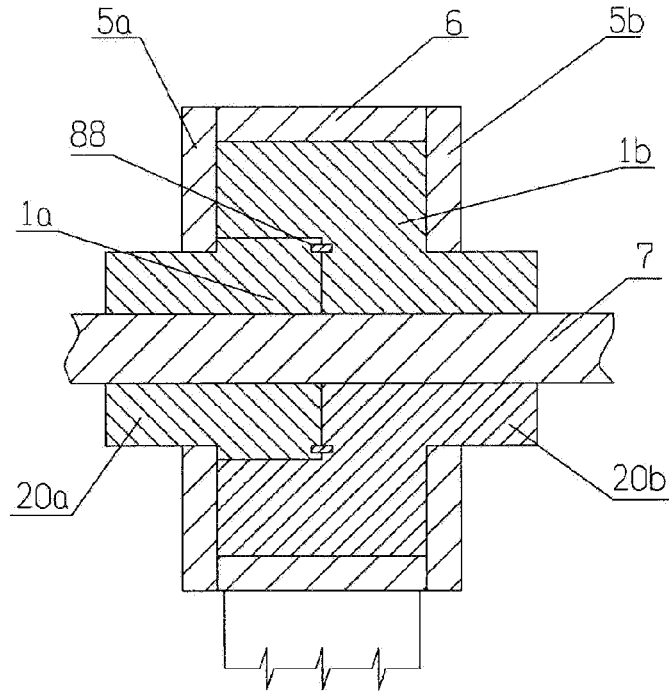
Figures 1, 2:
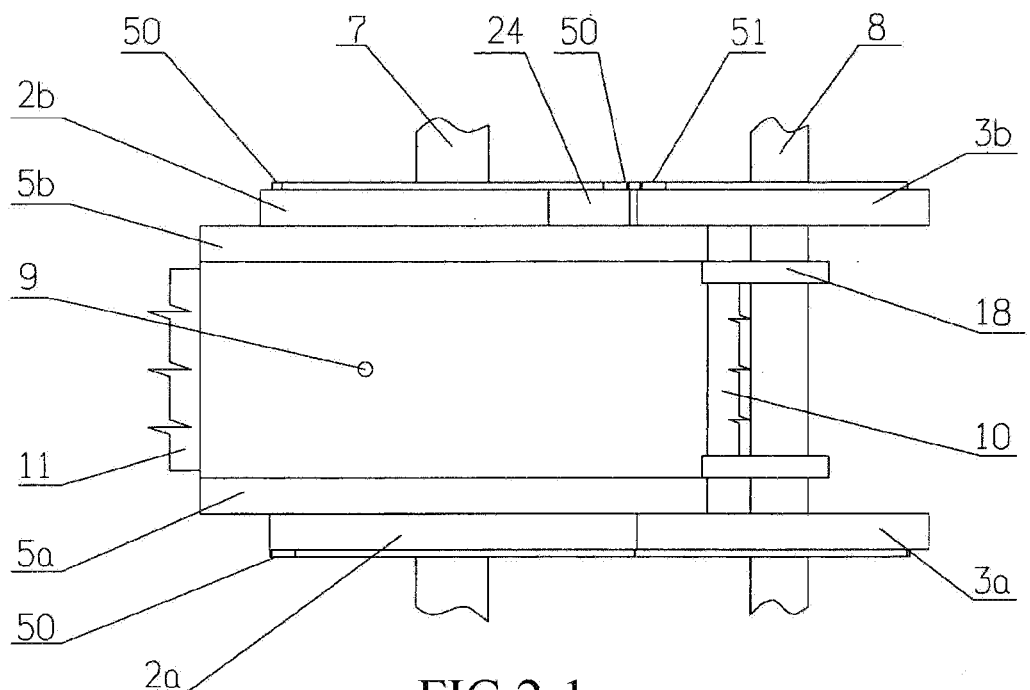
Figures 2, 3, 4, 5, 6, 7:
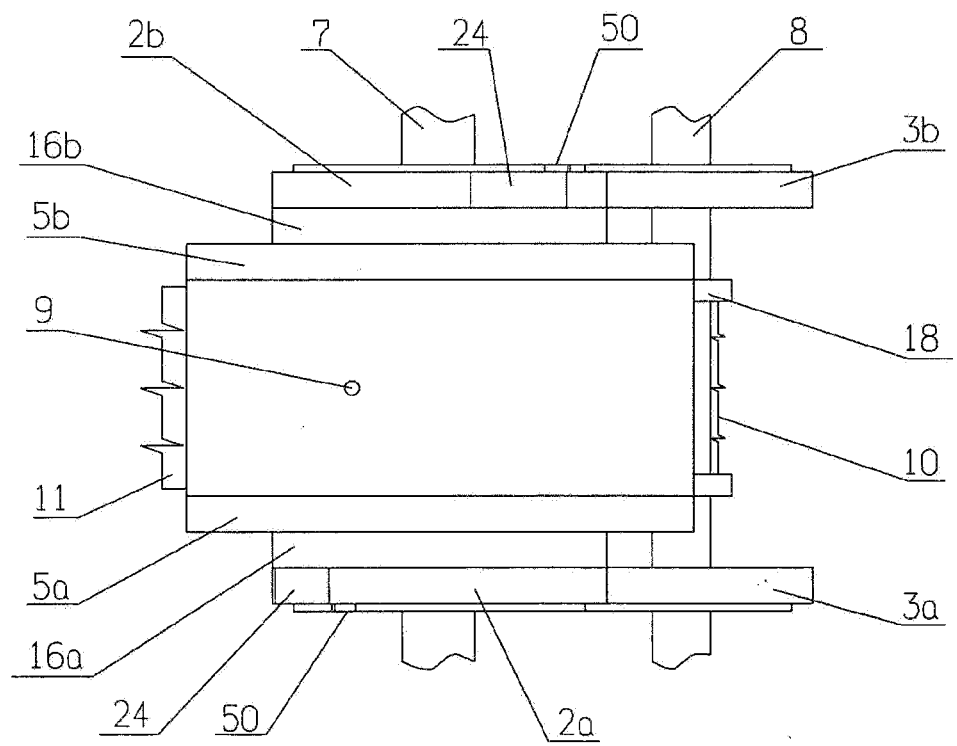
Figures 2, 3, 4:
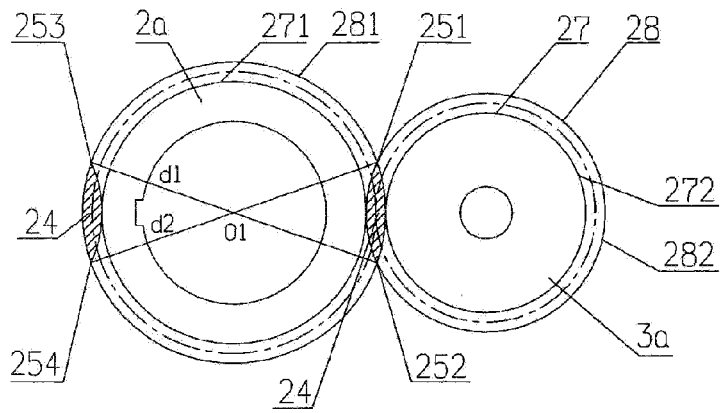
Figures 2, 3:
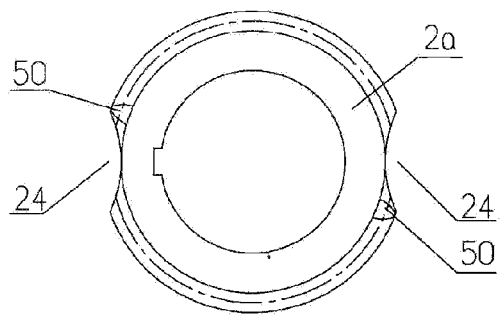
Figure 2:
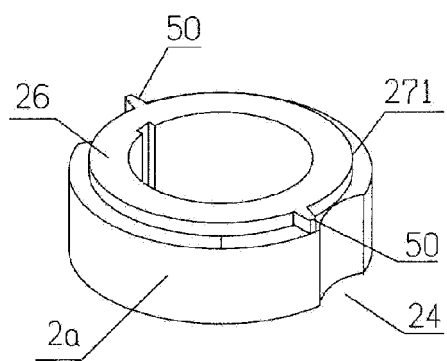
Figures 2, 3, 4, 5:
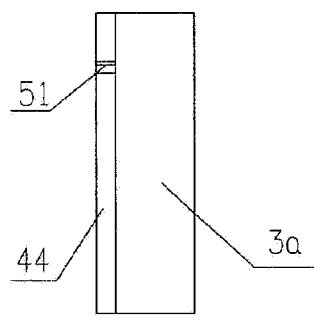
Figures 2, 3, 4, 5, 6:
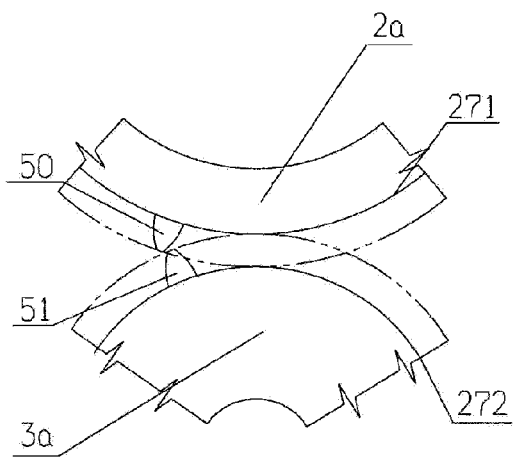
Figures 3, 4:
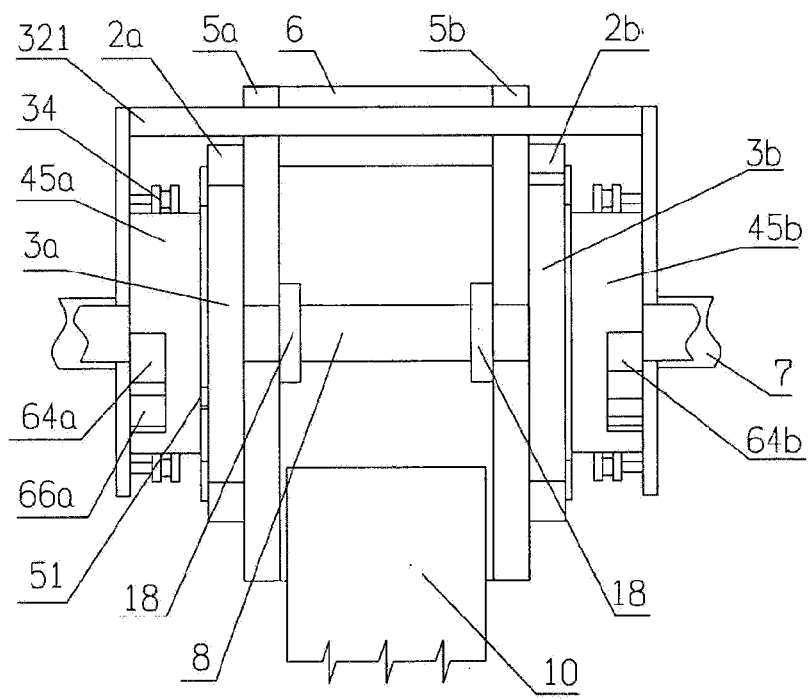

FIG. 3-1 illustrates the state at the beginning of locking up the first rotor gear 2a, at this time, one of the toothless portions 24 on the first rotor gear 2a is directly towards the first driving gear 3a; the pushing edge line 70 of the first sector control wheel 64a slides to the lock-up line 420 from the inclined surface 421 of the timing unlocked boss for pushing 42 of the first reciprocating block 65a. At this point, the first reciprocating block 65a is pushed to the leftmost end, and the C-shaped brake clamp 67 of the first reciprocating block 65a is tightly engaged with the C-shaped brake groove 76 of the first brake journal 66a. Thus, the first brake journal 66a is locked up and can not rotate, and then the first rotor gear 2a can be locked up. After that, with reference to FIG. 3-4, the arced surface for pushing and supporting 69 of the first sector control wheel 64a slides along the arced surface for pushing 422 of the timing unlocked boss for pushing 42, wherein one half in the circumferential direction of the arced surface for pushing and supporting 69 of the first sector control wheel 64a slides along the arced surface for pushing 422 of the rectangular block 671, and the other half in the circumferential direction of the arced surface for pushing and supporting 69 of the first sector control wheel 64a and the arced surface for pushing and supporting 69 of the sector rearward-protruding wing 691 slide along the arced surface for pushing 422 of the timing unlocked boss for pushing 42. During the slide movement, the first reciprocating block 65a can not be displaced and always lock up the first brake journal 66a. With reference to FIG. 3-5, when the unlocked control line 692 on the sector rearward-protruding wing 691 of the first sector control wheel 64a slides over the release line 423 on the timing unlocked boss for pushing 42 of the first reciprocating block 65a, the lock-up will be released and the first reciprocating block 65a will displace towards the first sector control wheel 64a, thereby the C-shaped brake clamp 67 provided thereon will be driven to be disengaged from the C-shaped brake groove 76 of the first rotor journal 20a, and then the first rotor journal 20a can be able to rotate freely. At this time, the arced surface for pushing 422 of the timing unlocked boss for pushing 42 on the first reciprocating block 65a abuts against the inner cylindrical portion 71 of the first sector control wheel 64a. The transition process from the lock-up state to the unlocked state is completed. The process from the lock-up state to the unlocked state will be repeated as the first sector control wheel 64a rotates.

The second reciprocating block 65b, which is located between the second brake journal 66b and second sector control wheel 64b of the second rotor gear 2b, can be controlled by the second sector control wheel 64b to perform the reciprocating linear movement periodically, so that the second rotor gear 2b can be controlled to rotate/stop periodically. Since the operation process of the second reciprocating block 65b is identical to that of the first reciprocating block 65a, the details thereof will not be described any more. In the present invention, the first rotor gear 2a rotates during the second rotor gear 2b is locked up; while the second rotor gear 2b rotates during the first rotor gear 2a is locked up. In this way, by means of the transmission mechanism, the power of the two rotors can be accumulated to the same one output shaft 8 and thereby outputted smoothly in a constant speed.

As illustrated in FIG. 3-13, in the control mechanism of the first embodiment, a timing boss for pushing 79 can be further provided on the side of the rectangular block 671 of the first reciprocating block. One surface of the timing boss for pushing 79 and the rectangular block 671 lie in the same plane, and the other surface of the timing boss for pushing 79 opposing to this surface is lower than the corresponding surface of the rectangular block 671 of the timing boss for pushing 79, so that a front timing indentation 80 can be formed between the timing boss for pushing 79 and the rectangular block 671.

As illustrated in FIG. 3-14, FIG. 3-15 and FIG. 3-16, in the control mechanism of the first embodiment, a sector forward-protruding wing 84 can be further provided on the first sector control wheel 64a. The sector forward-protruding wing 84 can be formed by extending a part of the sector portion of the first sector control wheel 64a outward from its rear surface (i.e. the side surface on the rear during the rotational movement). A guide convex strip 78 is provided at the front end of the sector forward-protruding wing 84. The sector forward-protruding wing 84 and the sector rearward-protruding wing 691 are provided at both sides of the sector portion and arranged in a staggered manner. The sector forward-protruding wing 84 has a thickness thinner than that of the sector portion, one surface of the sector forward-protruding wing 84 and one surface of the sector portion lie in the same plane, and another surface of the sector forward-protruding wing 84 is lower than another surface of the sector portion, so that a forward-protruding wing indentation 841 is formed between the sector forward-protruding wing 84 and the sector portion. The sector forward-protruding wing 84 has a sector angle ∠N around 30°, which is set on the basis of the principle that the sector forward-protruding wing 84 will not be blocked by the first sector control wheel 64a when it urges the reciprocating lever to move, and the sum of the ∠L and ∠M is equal to the angle occupied by the corresponding perimeter for doing work of the driving gear engaging with the perimeter of the rotor gear. The sector forward-protruding wing 84 is operated in cooperation with the timing boss for pushing 79. When the pushing edge line 70 of the first sector control wheel 64a reaches to the lock-up line 420 of the first reciprocating block, the guide convex strip 78 of the sector forward-protruding wing 84 reaches to the timing boss for pushing 79 in advance. With the arrangement of the sector forward-protruding wing 84 and the timing boss for pushing 79, the wear of the lock-up line 420 of the first reciprocating block and the pushing edge line 70 of the first sector control wheel 64a can be considerably reduced, thereby being advantageous for prolonging the lifetime of the first control mechanism.

As illustrated in FIG. 4-1, FIG. 4-2 and FIG. 4-3, in the second embodiment of the invention, the control mechanism comprises a controller bracket 321 fixedly installed with respect to the cylinder 6, a first sector control wheel 64a, a second sector control wheel 64b, a first brake journal 66a, a second brake journal 66b, a first reciprocating frame 45a and a second reciprocating frame 45b. Several pairs of pulleys 34 are installed on the controller bracket 321.

The structure of the control mechanism in the second embodiment merely differs from that of the control mechanism in the first embodiment in two aspects. On one hand, the controller bracket 321 has a different shape, but this is not the focus point of the present invention. In practice, the controller bracket can have any other shapes, as long as these shapes enable the reciprocating frame or the reciprocating block to slide thereon freely. On the other hand, the reciprocating members in the second embodiment are the first reciprocating frame 45a and the second reciprocating frame 45b.

As illustrated in FIG. 4-1, the first reciprocating frame 45a comprises a rectangular frame, wherein a timing unlocked boss for pushing 42 is provided inside of one of two opposing edges of the rectangular frame, and a C-shaped brake clamp 67 is provided on the other edge of the rectangular frame. The structure and function of the timing unlocked boss for pushing 42 are identical to those of the control mechanism of the first embodiment, both for driving the first reciprocating frame to perform the reciprocating movement under the control of the first sector control wheel. The structure and function of the C-shaped brake clamp 67 are identical to those of the control mechanism of the first embodiment, both for cooperating with the C-shaped brake groove of the first break journal 66a to drive the first rotor 1a stop or rotate.

The second reciprocating frame 45b is identical to the first reciprocating frame 45a in the structure, so that the details thereof will not be described any more.

The other portions of the control mechanism of the second embodiment which are identical to those of the control mechanism of the first embodiment in the structure will not be described any more.

As illustrated in FIG. 5-1, FIG. 5-2 and FIG. 5-3, in the present invention, the control mechanism of the third embodiment merely differs from the control mechanism of the first embodiment in that: one controller shaft 31 installed by the controller bracket 29 and in parallel with the transmission output shaft 8, as well as one controller gear 30 installed on the controller shaft 31 are added into the control mechanism. The first sector controller wheel 64a is installed on the controller shaft 31. The controller gear 30 is engaged with the first driving gear 3a. The first reciprocating block 65a is installed between the first brake journal 66a and the first sector control wheel 64a of the first rotor gear 2a.

The controller gear 30 facilitates for the installation of the controller bracket 322, and the axial dimension of the engine can be reduced at the same time, so that the various portions of the entire machine may be arranged in a compact structure, thereby being advantageous for decreasing the volume of the engine.

The other portions of the control mechanism in the third embodiment which are identical to those of the control mechanism of the first embodiment will not be described any more.

As illustrated in FIG. 5-4, in the present invention, the control mechanism of the fourth embodiment merely differs from the control mechanism of the third embodiment in that: the reciprocating members in this embodiment are the first reciprocating frame 45a and the second frame 45b. The other portions of the control mechanism in the fourth embodiment which are identical to those of the control mechanism of the first and second embodiments will not be described any more.

As illustrated in FIG. 6-1, FIG. 6-2 and FIG. 6-3, in the present invention, the control mechanism of the fifth embodiment comprises a controller bracket 29, two controller gear shafts 31 installed outside of the cylinder 6 and arranged in parallel with the transmission output shaft 8, a first controller gear 30a and a first bowknot-shaped control wheel 4a installed in a front portion of one of the controller gear shafts 31, and a second controller gear 30b and a second bowknot-shaped control wheel 4b installed in a rear portion of the other controller gear shaft 31, a reciprocating frame 12 controlled by two bowknot-shaped control wheels to perform the reciprocating movement, a first rotor control gear 16a installed on the first rotor journal 20a, a second rotor control gear 16b installed on the second rotor journal 20b, and a controller bracket 324 fixedly installed with respect to the cylinder 6 and having several pairs of pulleys 34 arranger thereon. The first control gear 30a is engaged with the first rotor control gear 16a; and the second control gear 30b is engaged with the second rotor control gear 16b.

As illustrated in FIG. 6-6 and FIG. 6-7, in the fifth embodiment of the present invention, the reciprocating frame of the control mechanism comprises a rectangular frame composed of two lengthwise sides and two widthwise sides. One timing unlocked boss for pushing 42 and one rear timing indentation 43 are provided on the two widthwise sides respectively. This timing unlocked boss for pushing 42 has the same structure as that of the timing unlocked boss for pushing 42 of the first reciprocating block 65a in the control mechanism of the first embodiment according to the present invention, and comprises an inclined surface 421, an arced surface for pushing 422 and a release line 423. As illustrated in FIG. 6-11, there are also provided with the timing boss for pushing 79 and the front timing indentation 80, both of which have the same structures as those of the first reciprocating block 65a. Various structures formed on the two widthwise sides are arranged centrosymmetrically.

As illustrated in FIG. 6-9, FIG. 6-10 and FIG. 6-14, in the control mechanism of the fifth embodiment according to the present invention, the first bowknot-shaped control wheel 4a is a rectangular body 52. The rectangular body 52 has two main surfaces, two lengthwise surfaces and two widthwise surfaces, and the angle ∠P1 between the diagonals on the main surfaces is identical to the angle ∠P on the first brake journal 66a. Each widthwise surface of the rectangular body 52 can be an arced pushing surface 54 conformed to the arced surface for pushing 422 of the timing unlocked boss for pushing 42 of the reciprocating frame. Each lengthwise surface of the rectangular body 52 can be composed of a planar surface 40 connected with one of the arced pushing surfaces 54, an arced surface 46 connected with the planar surface 40 in a smooth transition and concaved into the rectangular body 52, and an inclined surface 38 connecting the arced surface 46 and the arced pushing surface 54. The intersection line between the inclined surface 38 and the arced pushing surface 54 is a pushing edge line 50. The total length of the inclined surface 38 and the arced surface 46 is approximate to the length of the planar surface 40. When the first bowknot-shaped control wheel 4a is locked up, the inclined surface 421 of the reciprocating frame and the inclined surface 38 of the first bowknot-shaped control wheel 4a abut against each other, and the arced surface for pushing 422 of the reciprocating frame and the arced surface 46 of the first bowknot-shaped control wheel 4a abut against each other.

The rectangular body 52 extends outward from its planar surface 40 to form a rearward-protruding wing 47, wherein the rearward-protruding wing 47 has a thickness about one-third of the thickness of the rectangular body 52, and one surface of the rearward-protruding wing 47 and one surface of the rectangular body 52 lie in the same plane. The rearward-protruding wing 47 has the same structure as that of the sector rearward-protruding wing 691 of the first sector control wheel 64a. As illustrated in FIG. 6-11 and FIG. 6-12, in this embodiment, the rectangular body 52 also can be provided with a forward-protruding wing 58 extending outward from its inclined surface 38, wherein the forward-protruding wing 58 has a thickness about one-third of the thickness of the rectangular body 52, one surface of the forward-protruding wing 58 and one surface of the rectangular body 52 lie in the same plane, and another surface of the forward-protruding wing 58 is lower than another surface of the rectangular body 52. A guide convex strip 78 is provided in the front end of the forward-protruding wing 58. The forward-protruding wing 58 and the rearward-protruding wing 47 are provided on both sides of the lengthwise surfaces of the rectangular body 52 respectively and arranged in a staggered manner. Various structures formed on two lengthwise surfaces of the rectangular body 52 are arranged to be centrosymmetrical.

As illustrated in FIG. 6-13, the second bowknot-shaped control wheel 4b has the same structure as that of the first bowknot-shaped control wheel 4a, so that the details thereof will not be described any more.

As illustrated in FIG. 6-14, the angle ∠N1 of the rearward-protruding wing 47 is equal to the angle ∠L1 of the forward-protruding wing 58, the angle ∠N1 or ∠L1 can be obtained by subtracting the angle occupied by the length of the driving gear for doing work from 180°, then subtracting ∠P1 between the diagonals on the main surfaces of the rectangular body 52, and dividing by 2 finally. The points O3, O4 and O5 are positioned on the same line and separated from each other at a distance equal to the radius of the bowknot-shaped control wheel, and the arced surface 46 of the rectangular body 52 is obtained by drawing circles taken the points O3, O4 and O5 as the centre thereof and taken the radius of the bowknot-shaped control wheel as the radius thereof, thereby the arced surface 46 is conformed to the arced surface for pushing 422 of the timing unlocked boss for pushing 42.

As illustrated in FIG. 6-4, FIG. 6-1 and FIG. 6-5, the process that two bowknot-shaped control wheels are controlled by the reciprocating frame 12 will be described as follows.

As illustrated in FIG. 6-4, the arced surface 46 and the inclined surface 38 of the first bowknot-shaped control wheel 4a are contacted and fitted with the arced surface for pushing 422 and the inclined surface 421 on one side of the reciprocating frame 12 respectively, so that the first bowknot-shaped control wheel 4a and the reciprocating frame 12 are locked up with each other; at this time, the pushing edge line 50 of the second bowknot-shaped control wheel 4b reaches to the lock-up line 420 on the other side of the reciprocating frame, then the pushing edge line 50 travels across the lock-up line 420, and the arced pushing surface 54 of the second bowknot-shaped control wheel 4b slides along the arced surface for pushing 422 (see FIG. 6-1) until the arced pushing surface 54 on the rearward-protruding wing 47 of the second bowknot-shaped control wheel 4b slides over the top of the timing unlocked boss for pushing 42 of the reciprocating frame 12, so that the reciprocating frame 12 is unlocked (see FIG. 6-5). The first and second bowknot-shaped control wheels 4a, 4b rotate together, while the reciprocating frame 12 is unlocked, with an angle equal to the angle of one sector piston; and the pushing edge line 50 of the first bowknot-shaped control wheel 4a slides along the inclined surface 421 of the reciprocating frame 12 to urge the reciprocating frame 12 to move towards the first bowknot-shaped control wheel 4a. As the second bowknot-shaped control wheel 4b goes on rotating, when the other pushing edge line 50 of the second bowknot-shaped control wheel 4b reaches to the inclined surface 421 on the other side of the reciprocating frame 12, and when the pushing edge line 50 of the first bowknot-shaped control wheel 4a slides to the lock-up line 420, the arced surface 46 and the inclined surface 38 of the second bowknot-shaped control wheel 4b are contacted and fitted with the arced surface for pushing 422 and the inclined surface 421 of the reciprocating frame 12 respectively, so that the second bowknot-shaped control wheel 4b and the reciprocating frame 12 are locked up with each other, after that, the next circulation from the lock-up state to the unlocked state and then back to the lock-up state will be started. The first bowknot-shaped control wheel 4a slides along the arced surface for pushing 422 of the reciprocating frame 12 until the arced pushing surface 54 on the rearward-protruding wing 47 of the first bowknot-shaped control wheel 4a slides over the top of the timing unlocked boss for pushing 42 of the reciprocating frame 12, so that the reciprocating frame 12 is unlocked. Thus, the reciprocating frame 12 is urged to move towards the second bowknot-shaped control wheel 4b under the action of the second bowknot-shaped control wheel 4b, and the process can be circulated in this way.

In this embodiment, in the case where the bowknot-shaped control wheel is provided with a forward-protruding wing 58 and the reciprocating frame 12 is provided with a timing boss for pushing 79, the forward-protruding wing 58 will be operated in cooperation with the timing boss for pushing 79. When the pushing edge line 50 of the bowknot-shaped control wheel reaches to the lock-up line 420 of the reciprocating frame, the guide convex strip 78 of the forward-protruding wing 58 reaches to the timing boss for pushing 79 at the same time or in advance. The forward-protruding wing 58 and the timing boss for pushing 79 function as reducing the wear of the pushing edge line 50 and the lock-up line 420, thereby being advantageous for prolonging the lifetime of the first rotor control mechanism.

As illustrated in FIG. 7-1, FIG. 7-2 and FIG. 7-3, in the present invention, the rotor control mechanism of the sixth embodiment merely differs from the rotor control mechanism of the fourth embodiment only in that: the reciprocating member is a reciprocating block 33 instead of the reciprocating frame. The reciprocating block 33 comprises a rectangular block, two rear timing indentations 43, and two timing unlocked bosses for pushing 42 arranged on the rectangular block centrosymmetrically as described in the fourth embodiment. As illustrated in FIG. 7-5, the rectangular block also can be provided with two front timing indentations 80 and two timing bosses for pushing 79 arranged centrosymmetrically.

The other structure and operation process of the rotor control mechanism in the sixth embodiment are identical to those of the rotor control mechanism in the fourth embodiment, so that the details thereof will not be repeated any more.

By means of the rotor control mechanism of the present invention, the timing control of the rotor can be achieved for the first time, the rotation time length and the stop time length of the rotor both can be controlled accurately, and braking and unlocking of the rotor can be achieved accurately and punctually.

As illustrated in FIG. 1-8 and FIG. 1-10, at the position where the first rotor journal 20a is connected with the inner cylindrical cylinder 99a, a sealing groove may be provided on the circumference of the inner cylindrical cylinder 99a.

Figures 1, 3:
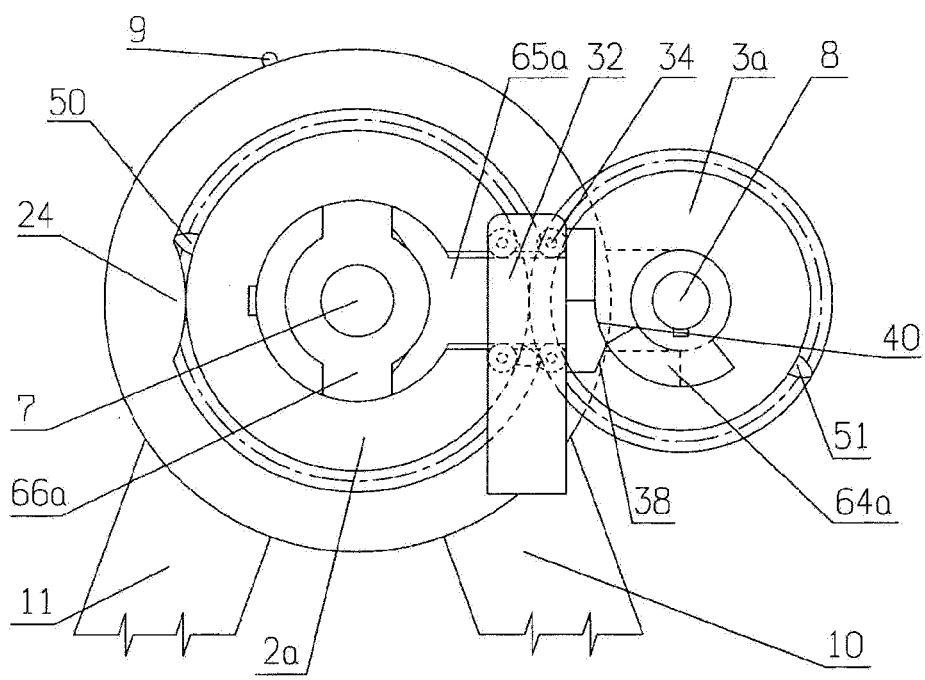
Figures 2, 3:
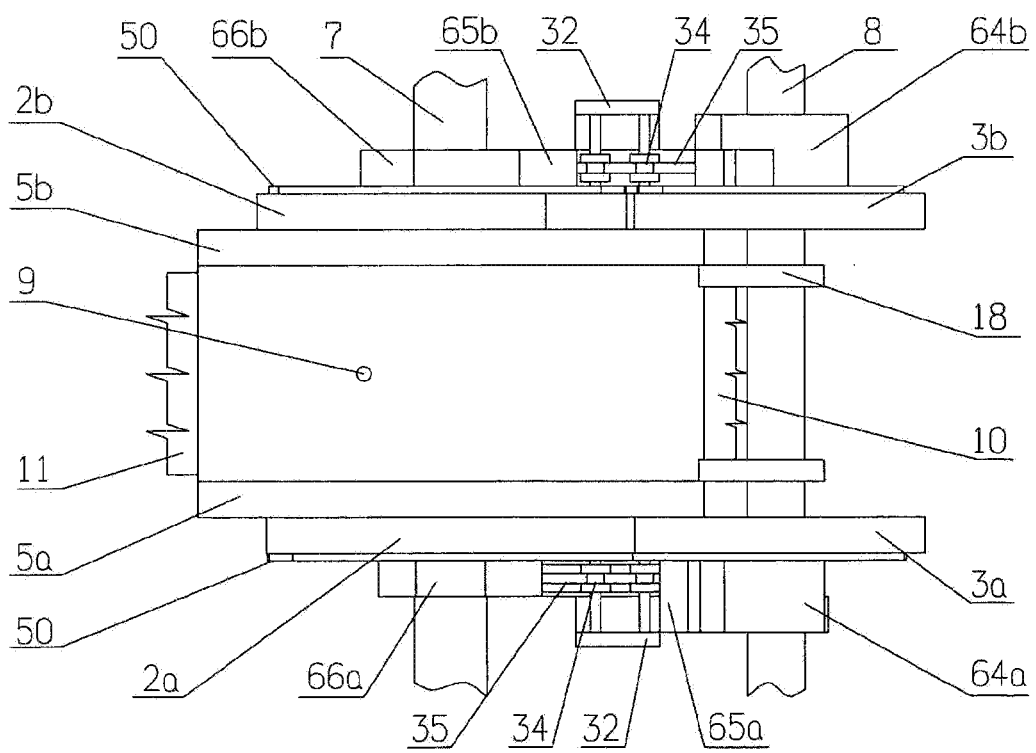
Figure 3:
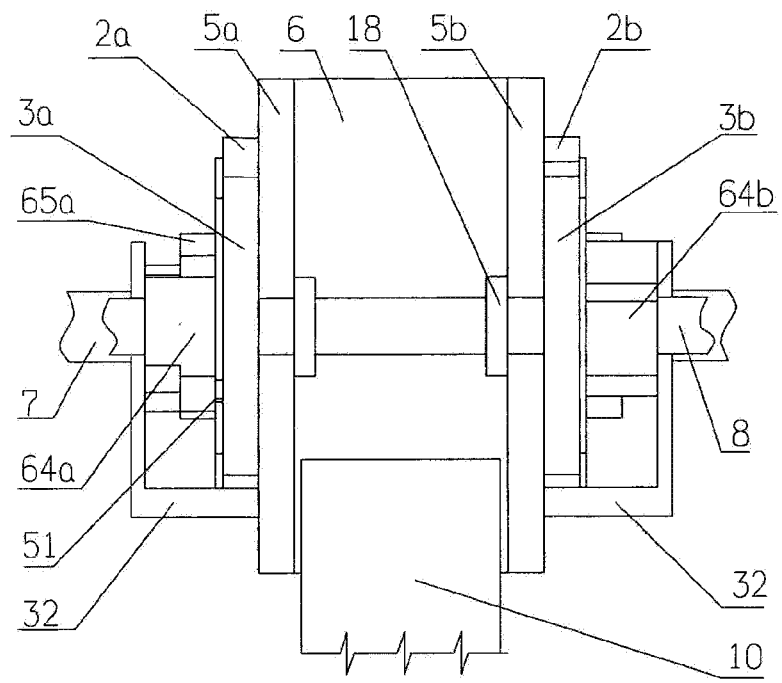
Figures 3, 4:
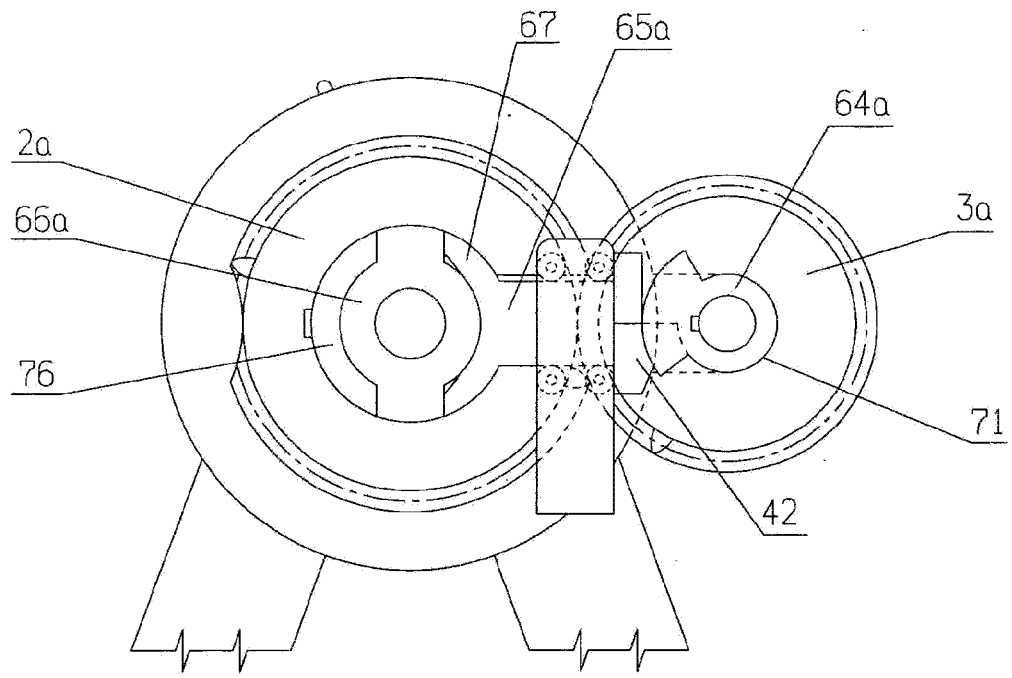
Figures 3, 4, 5:
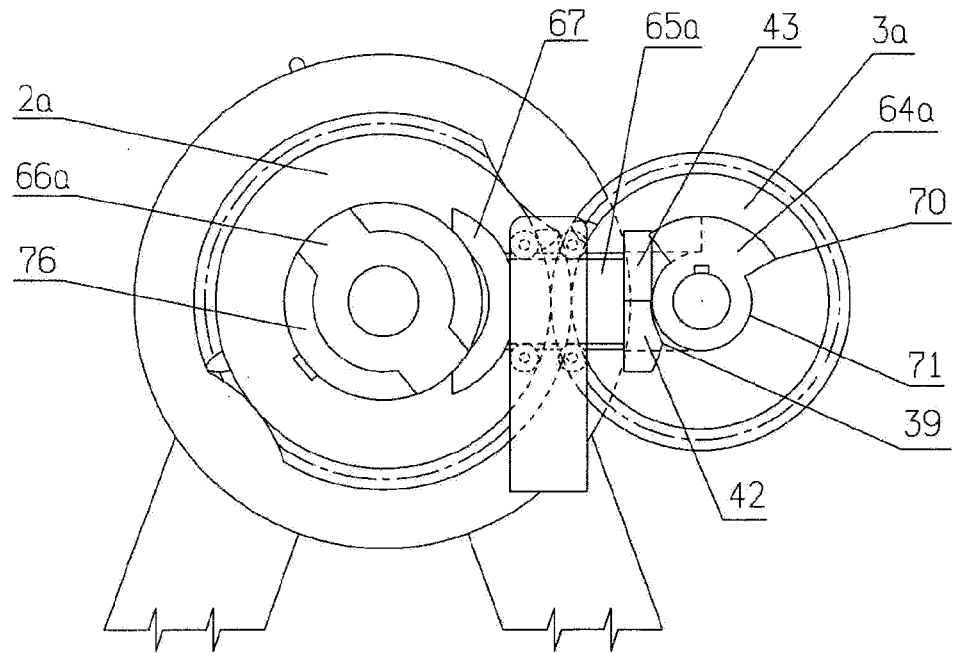
Figures 3, 4, 5, 6:
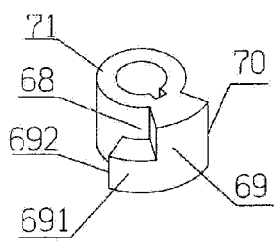
Figures 3, 4, 5, 6, 7:
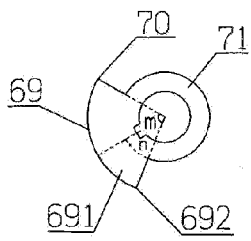
Figures 3, 4, 5, 6, 7, 8:
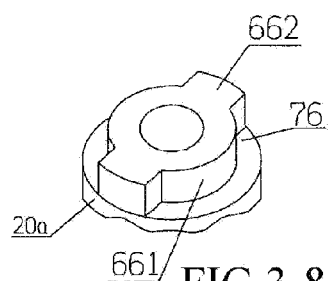
Figures 3, 4, 5, 6, 7, 8, 9:
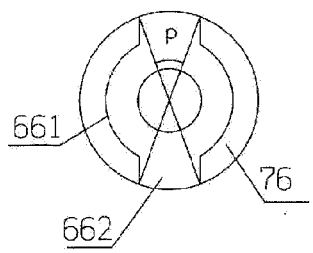

As illustrated in FIG. 9-1, this sealing groove can be sealed by utilizing an O-type sealing ring 85; as illustrated in FIG. 9-2, this sealing groove also can be sealed by utilizing two C-shaped sealing strips 86. As illustrated in FIG. 1-8, FIG. 1-10 and FIG. 1-11, at the positions excluding the joint position of the first sector piston 17a with the inner cylindrical cylinder 99a, two sealing grooves are arranged to be in parallel with the axis and surround the first sector piston 17a. The sealing grooves have to be arranged on the surface of the first sector piston 17a and can not be crossed and connected with the combustion chamber.

As illustrated in FIG. 1-9 and FIG. 1-11, an annular groove 19 may be provided on the end surface of the inner cylindrical cylinder 99a, from which the first sector piston 17a is protruding, as adjacent to the outer circumference of the inner cylindrical cylinder 99a as possible, so as to reduce the longitudinal sealing depth. The sealing groove on the first sector piston 17a is directly connected with the sealing groove on the end surface of the inner cylindrical cylinder 99a. The sealing groove on the first sector piston 17a is connected with the annular groove 19 for reducing the longitudinal sealing depth by means of a L-shaped sealing strip groove 73. With reference to FIG. 1-5, FIG. 1-6 and FIG. 9-5, the annular grooves 19 for reducing the longitudinal sealing depth on the contact surfaces of the inner cylindrical cylinder 99a of the first rotor 1a and the inner cylindrical cylinder 99b of the second rotor 1b are aligned with each other, and an O-type sealing ring (see FIG. 9-4) is embedded therein, thereby airtightness on the longitudinal contact surfaces of two rotors can be achieved.

With reference to FIG. 9-5, a spring 89 may be provided on the circumference portion, where the two rotors 99a and 99b are contacted with each other, and the end surface portion adjacent to this circumference portion, a L-shaped sealing strip 90 may be provided between the spring 89 and the second rotor 99b, and a longitudinal sealing piece 72 may be provided between the spring 89 and the end surfaces of the second rotor 99b. In addition, an O-type sealing ring 88 may be provided between the end surfaces where the two rotors are contacted with each other and be located at the end of the longitudinal sealing piece 72.

Between the first sector piston 17a and the end of the inner cylindrical cylinder 99a from which the first sector piston 17a protrudes, the L-shaped sealing strip 90 is embedded into the L-shaped sealing strip groove 73 on the first rotor and be tightly pressed by the spring 89. A small longitudinal sealing piece 72 is provided tightly against the L-type head of the L-shaped sealing strip 90, and contacted tightly with the O-type sealing ring 88 for reducing the longitudinal sealing depth under the action of the spring 89, so that a better sealing performance can be achieved. The head of the L-shaped sealing strip 90 will be raised up on the O-type sealing ring 88 such that a gap is formed between the head and the inner cylindrical cylinder of the other rotor when it is longer; and a gap will be also formed between the head and the O-type sealing ring 88 when it is shorter. The head of the L-shaped sealing strip 90 adopts the design with smaller size, and a small longitudinal sealing piece 72 is provided tightly against the head to compensate the gap formed between the head and the O-type sealing ring 88, thereby a completely sealing can be achieved. With reference to FIG. 9-1, FIG. 9-2 and FIG. 9-3, the entire sealing strip encloses the first rotor 1a in the direction parallel to the axis for the purpose of sealing, so as to ensure air-tightness of the operation chamber of four strokes, i.e. an intake stroke, a compression stroke, a power stroke and an exhaust stroke. As illustrated in FIG. 1-10 and FIG. 1-11, several fine orifices 98 are manufactured at the sealing groove on the rotor, such that the lubricant penetrates through the fine orifices to provide lubrication for the operation of the seal, and achieves air-tightness effect in cooperation with the seal.

With the arrangement of the present invention, the problem that the longitudinal slit generated when two rotors are engaged with each other is prone to induce the air leakage has been solved, and the problem of how to seal the complicated geometric surfaces of the rotor has also been solved, thereby the sealing problem of the engine can be completely solved.

As illustrated in FIG. 8, the center support shaft 7 in the dual-rotor engine of the present invention is hollow, has a center conduit 96 and is provided with injection hole 97 at the position where the rotor is installed. An aperture passage 94 may be provided within each of the two rotors. Moreover, an oil outlet conduit 93 may be communicated with the cylinder wall. The cylinder 6, the disk-shaped front end cover 5a and rear end cover 5b are provided with a plurality of conduits 91 communicated with each other, respectively.

The lubricant can be pumped into the center conduit 96 of the center support shaft 7 and injected towards the inside of the rotors through the injection hole 97 on the center support shaft. The lubricant passes through the aperture passage 94 within the rotors under the action of the pressure and the centrifugal force, and then enters into the chamber 95 inside the rotors. After the lubricant is heat exchanged within the chamber 95, the lubricant flows towards the surface of the rotor sector piston 17 that is contacted with the tubular cylinder 6. The lubricant flows out from the oil outlet conduit 93 on the cylinder wall when the rotor is broken. The cylinder 6, the disk-shaped front end cover 5a and rear end cover 5b are provided with a plurality of conduits 91 communicated with each other respectively, and the coolant is filled into the conduits 91 to cool the engine.

With the present invention, the oil injection within the center supporting shaft, the hollow design of the dual-rotor, the centrifugal movement of the lubricant, and the design of the oil outlet of the cylinder can be solved creatively, and the temperature decreasing inside the rotor can be achieved; at the same time, there is a water-cooling system on the cylinder, thereby the rotor can be maintained within a corresponding temperature range, and thus the thermal deformation of the rotors can be reduced while the mechanical strength will not be reduced. Meanwhile, the problem of the lubrication inside the cylinder can be solved for the first time by way of supplying the lubricant into the cylinder through the fine orifices on the rotor sealing strip.

In the present invention, a rotor reverse blocking device also can be further provided.

Figures 3, 4, 5, 6, 7, 8, 9, 10, 11:
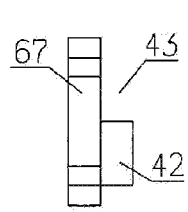

As illustrated in FIG. 10-1, the rotor reverse blocking device comprises a camshaft 104 in parallel with the transmission output shaft 8, a swing driven member 105 and a spring 89, in which a cam gear 108 and a disc cam 110 are installed on the camshaft 104, and the cam gear 108 is engaged with the driving gear. The swing driven member 105 comprises: a swing rod, and a L-shaped erecting triangular end arranged at one end of the swing rod and operated in cooperation with the brake bulges 662 of the brake journal, and having a standup surface 106 and an inclined surface 107. The triangular end is pressed against the brake bulges 662 by the spring 89.

In such an arrangement, the cam gear 108 is mounted and fastened on the camshaft 104 in parallel with the transmission output shaft 8, and drives the disc cam 110. The L-shaped erecting triangular end disposed on the swing driven member 105 can be engaged with the brake bulges 662 on the first brake journal 66a, faces towards the rotation direction of the first beak journal 66a, and has a large inclined surface 107 and a standup surface 106 towards the rotation direction of the first beak journal 66a. When the brake bulge 662 on the first brake journal 66a rotates to contact with the inclined surface (or arced surface) 107, the brake bulge 662 presses the L-shaped erecting triangular end of the swing driven member 105 down along the inclined surface 107, so that the rotation of the first brake journal 66a can not be interfered.

As illustrated in FIG. 10-2, after the first brake journal 66a is braked by the reciprocating lever, the first brake journal 66a is driven to rotate by the cam gear 108, and the convex end of the disc cam 110 presses down the other end of the swing driven member 105 such that the triangular end is raised up, then the brake bulge 662 is obstructed by the standup surface 106 of the triangular end, so the reverse rotation can be prevented. After that, the next circulation of "obstruction-separation-obstruction" will be started. The spring 89 acts on the triangular end (or triangular head) of the swing driven member 105 to enable the triangular end to engage with the brake bulges 662 closely. The present invention mainly adopts the reverse blocking device composed of the cam and swing driven member. Moreover, such a device described in the above-mentioned embodiment is only one mode of the reverse blocking device that can be suitable for the present invention.

Another reverse blocking device is of a pin-typed rotor reverse blocking device in which the pin can be thrown out in a centrifugal direction.

As illustrated in FIG. 10-3, each sector piston of the rotors has at least one radial hole, and a triangular recess may be provided on the position of the cylinder corresponding to each radial hole. The rotor reverse blocking device comprises pins and springs disposed in the radial holes, in which the tip of the pin may be formed into a triangular or wedge shape and has a vertical surface orientated towards the reverse-rotating direction of the rotors and an inclined surface or arced surface orientated towards the cylinder.

When the rotor rotates to the braking position, the pin 109 are thrown out immediately and inserted into the triangular recesses 111 on the cylinder 6 under the action of the centrifugal force and elastic force of the spring. Thus, the cylinder is jammed by the reacting force generated when the rotors are urged by the pressure of the gas expansion, and thus the rotors are prevented from reversely rotating. When the rotors rotate forward, the inclined surfaces 107 of the pins are pressed automatically into the inside of the rotors by the cylinder 6. This reverse blocking device also can be provided on the rotor journal.

In the present invention, it is necessary to arrange a weight counterbalance in the case that the number of the cylinders is not three or a multiple of three.

The rotor gear has a larger perimeter, while the driving gear has a smaller perimeter, and thus a special transmission rate of 360° to 280° can be obtained. The time length for the rotors doing work will be evenly outputted to the transmission output shaft twice within the rotation range of 360°, i.e., the outputted time length pre time is about 120°. Therefore, the engine with one cylinder or two cylinders can not output power evenly, and thereby it is necessary to arrange a weight counterbalance for keeping balance. However, in the case of the engine with three cylinders, two of the three cylinders will do work at every moment so as to output power evenly, so that it is unnecessary to arrange a weight counterbalance. Accordingly, in order to solve the problems such as discontinuous power output, uneven power output and vibration, a weight counterbalance is necessary to be provided in the case that the number of the cylinders is not three or a multiple of three. Since one cylinder outputs power corresponding to about 120° with a time interval in a 360° transmission output cycle of the present invention, such a weight counterbalance is required to be provided.

As illustrated in FIG. 11-1, the transmission output shaft 8 is provided with two weight counterbalances 112 symmetrically; or as illustrated in FIG. 11-2, the flywheel 41 is provided with two weight counterbalances 112 symmetrically, so that the balance of the power output can be achieved.

Figures 3, 4, 5, 6, 7, 8, 9, 10, 11, 12:
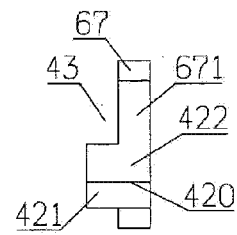
Figures 3, 4, 5, 6, 7, 8, 9, 10:
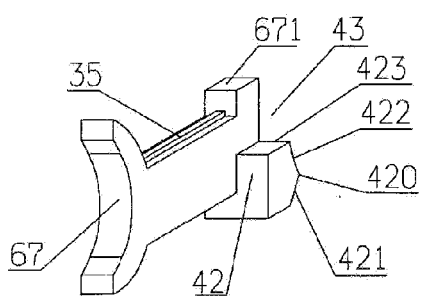

As illustrated in FIG. 12-1, an exhaust turbocharger 114 is installed inside each of the inlet port 10 and the outlet port 11, and a link is connected between the two exhaust turbochargers 114.

As illustrated in FIG. 12-1, the technique concerning natural aspiration and variable-compression ratio is shown. That is to say, the cylinder is set to have a maximum compression rate. For example, the compression ratio is set to be 18:1 in the case of utilizing diesel, and then, taking the compression ratio of diesel as a reference, the engine compression rate may be set to be 18:1. In such a case, it will bring about no problem if the engine utilizes diesel. When the two sector pistons 17a and 17b within the cylinder 6 abut against each other to constitute the combustion chamber 15, the largest compression chamber can be formed between the cylinder 6 and the two rotors 1a and 1b, so that the total amount of the gas intake is achieved and the largest compression ratio is 18:1. A hole is drilled in the intake compression region of the cylinder 6 and at the middle portion of the cylinder wall, and an intake relief valve 113 is installed onto the hole. By opening the intake relief valve on the cylinder wall, such as, releasing the excess air after intake of gas, the engine compression ratio will be reduced to for example 10:1, that is to say, the compression ratio is reduced from 18:1 to 10:1. Thus, the gasoline can be utilized to provide power. The value of the compression ratio can be changed by adjusting the open degree of the intake relief valve 113, and also can be adjusted by providing a plurality of intake relief valves 113 on the cylinder wall and selectively opening the corresponding one of the intake relief valves depending on the desired value of the compression ratio. A plurality of compression ratios can be obtained by adjusting the open degree or the number of the intake relief valves.

In the case of adopting the solution of the intake supercharging technique, such as utilizing the exhaust turbocharger 114, adopting the intake supercharging will enable the total amount of intake gas to be substantially larger than the amount of intake gas to be employed under the desired pressure for achieving the compression ratio value, and the excess air exceeding the desired pressure will be discharged from the intake relief valve 113. In the engine utilizing this solution, the compression ratio set in the normal condition can be any compression ratio, such as 18:1 or 10:1 or others. The intake supercharging also can be a mechanical supercharging or these two supercharging methods can be used in combination.

For example, as illustrated in FIG. 12-2, the variable compression ratio is intelligent. The variable compression ratio can be achieved by collecting a variety of information by means of the electronic processor and obtaining an optimum solution after the information being processed. For instance, the electronic processor is used to receive and process the information on the operation condition of the vehicle, the ship or the machine, the information on the operation condition of the engine, the fuel information, the intake or the intake supercharging information, the information on the compression ratio within the cylinder and so on, so as to select the fuel, the compression ratio, the ignition manner, and the operating manner of the supercharger, and then convey the selected results to the actuating unit, thereby the effect of the variable compression ratio can be optimized.

The dual-rotor engine of the present invention can utilize a variety of fuel flexibly and operation modes of both spark ignition and compression ignition, thus free switch between a large torque and a large power has been achieved for the first time. Therefore, the operating efficiency of the engine can be enhanced effectively and the energy consumption can be reduced.

Figures 3, 4, 5, 6, 7, 8, 9, 10, 11, 12, 13, 14:
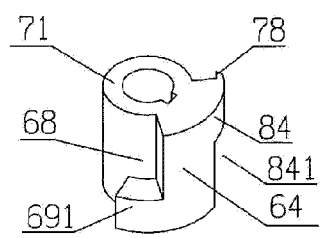
Figures 3, 4, 5, 6, 7, 8, 9, 10, 11, 12, 13:
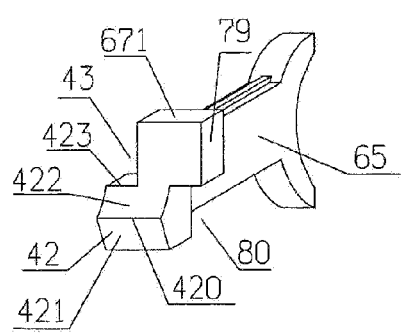
Figures 3, 4, 5, 6, 7, 8, 9, 10, 11, 12, 13, 14, 15:
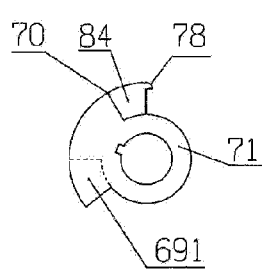
Figures 3, 4, 5, 6, 7, 8, 9, 10, 11, 12, 13, 14, 15, 16:
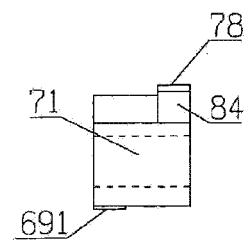
Figures 1, 4:
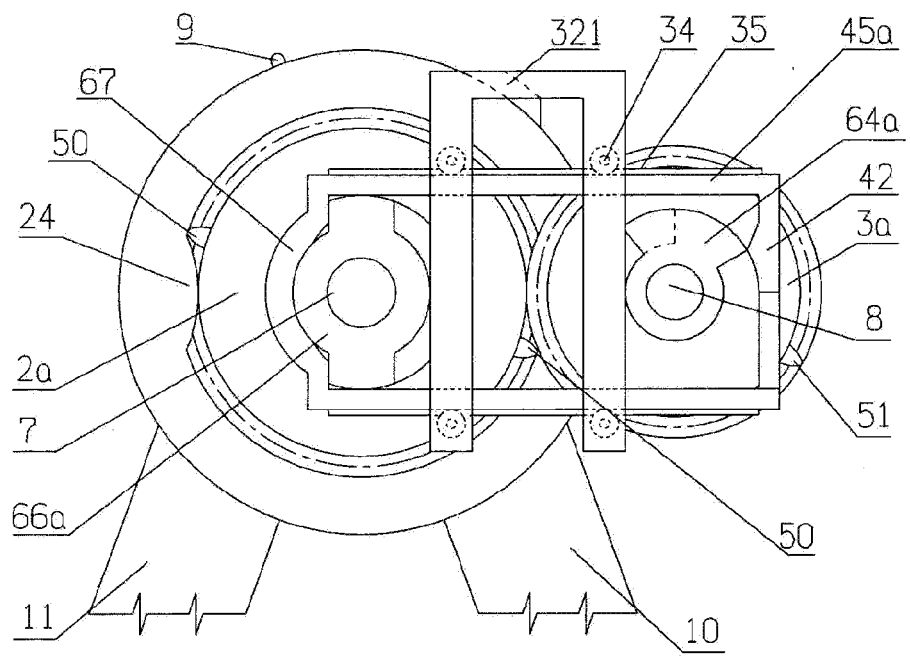
Figures 2, 4:
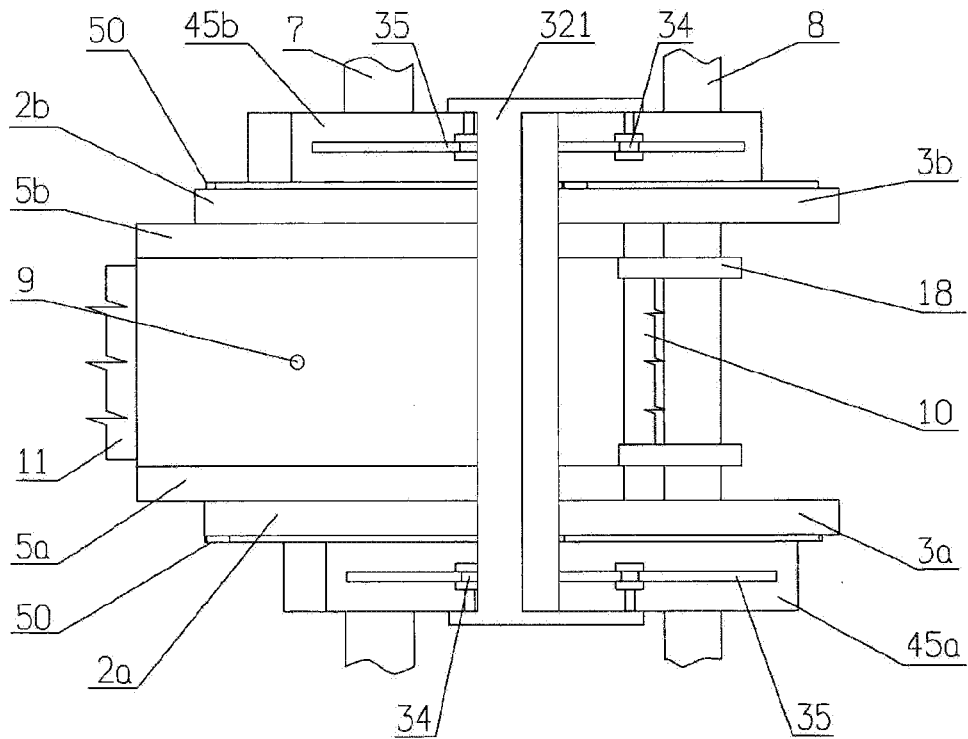
Figures 1, 5:
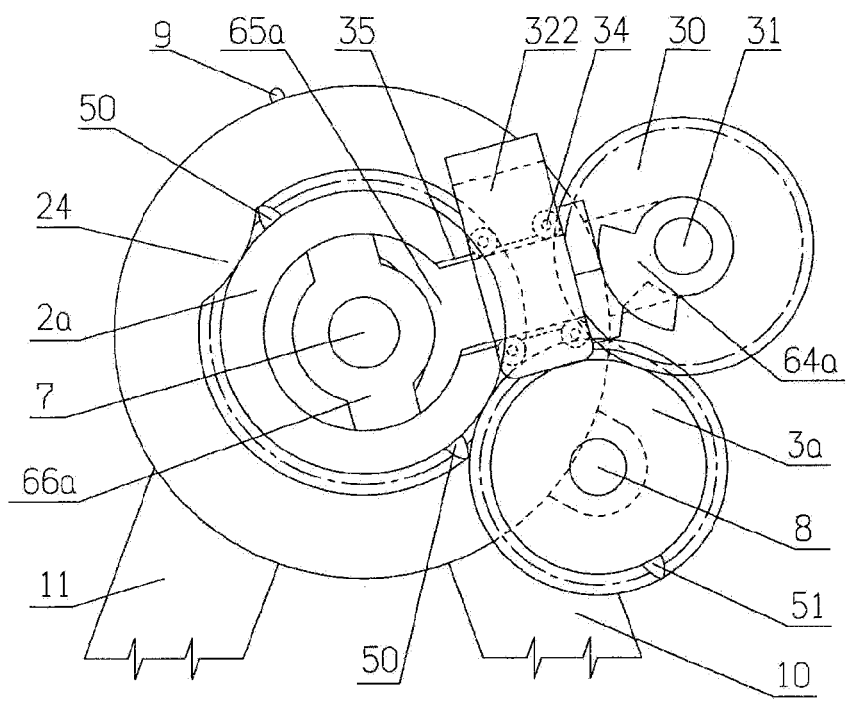
Figures 2, 5:
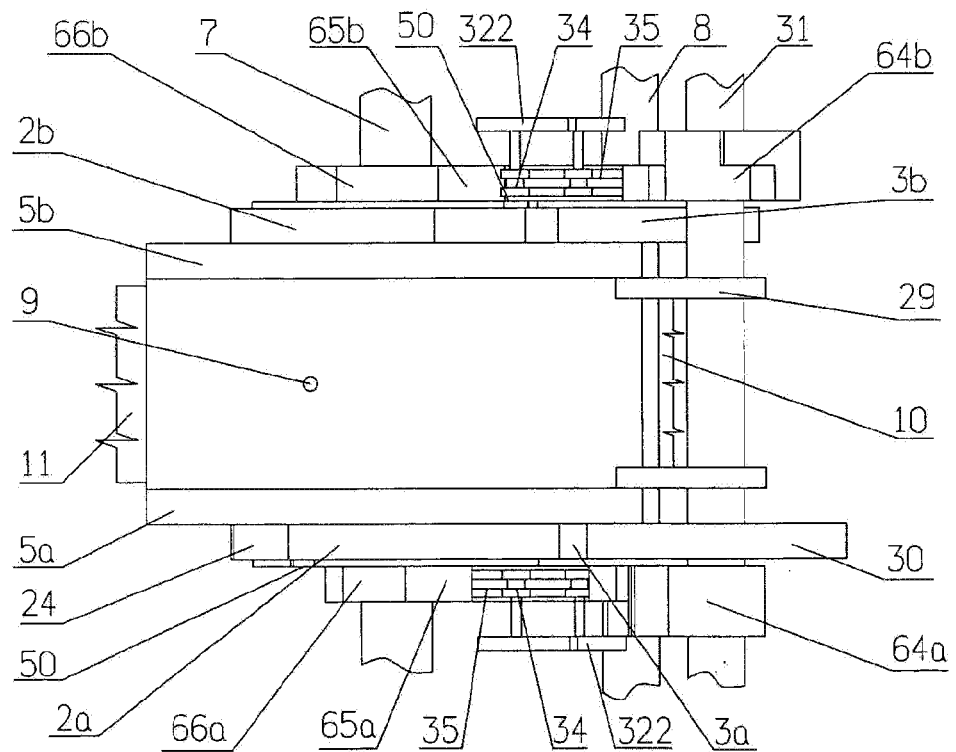
Figures 3, 5:
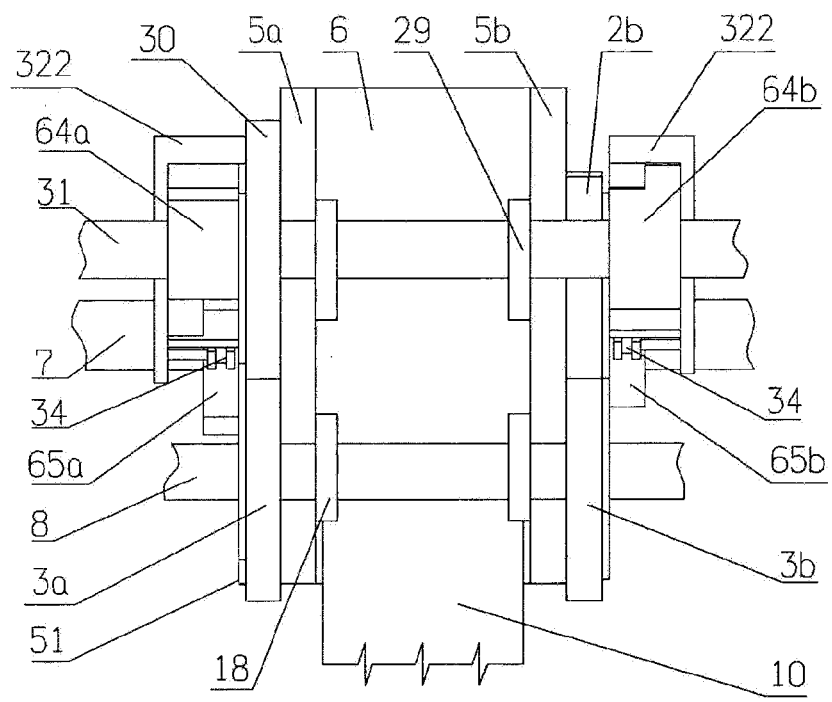
Figures 4, 5:
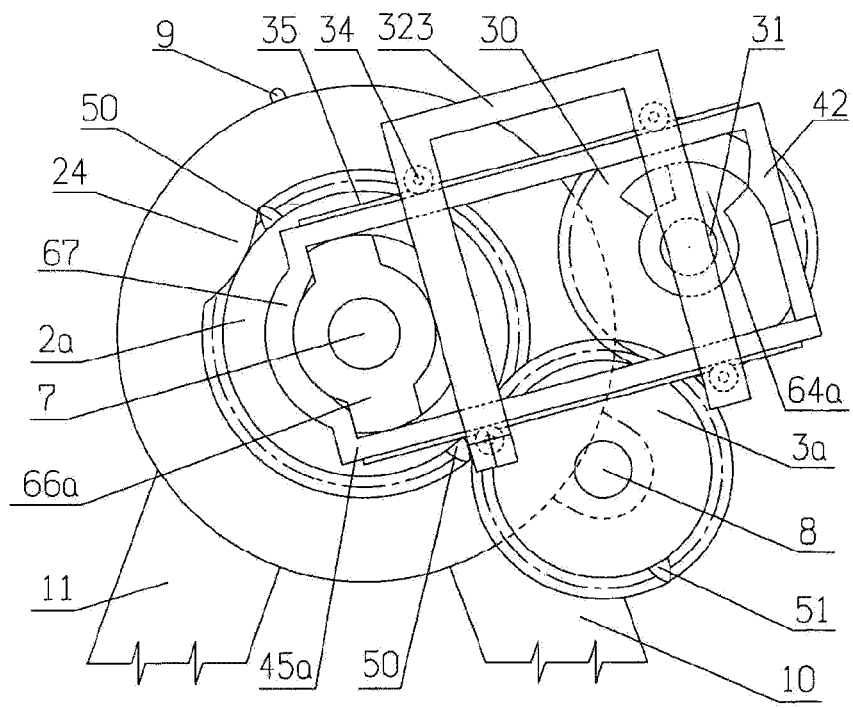
Figures 1, 6:
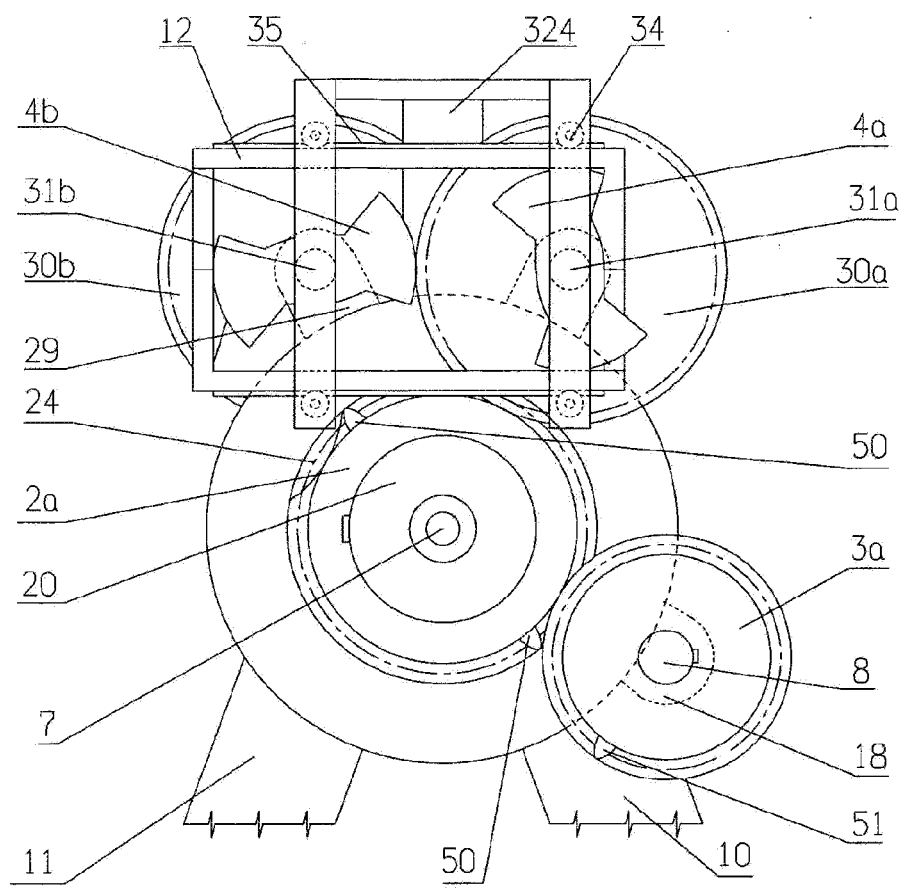
Figures 2, 6:
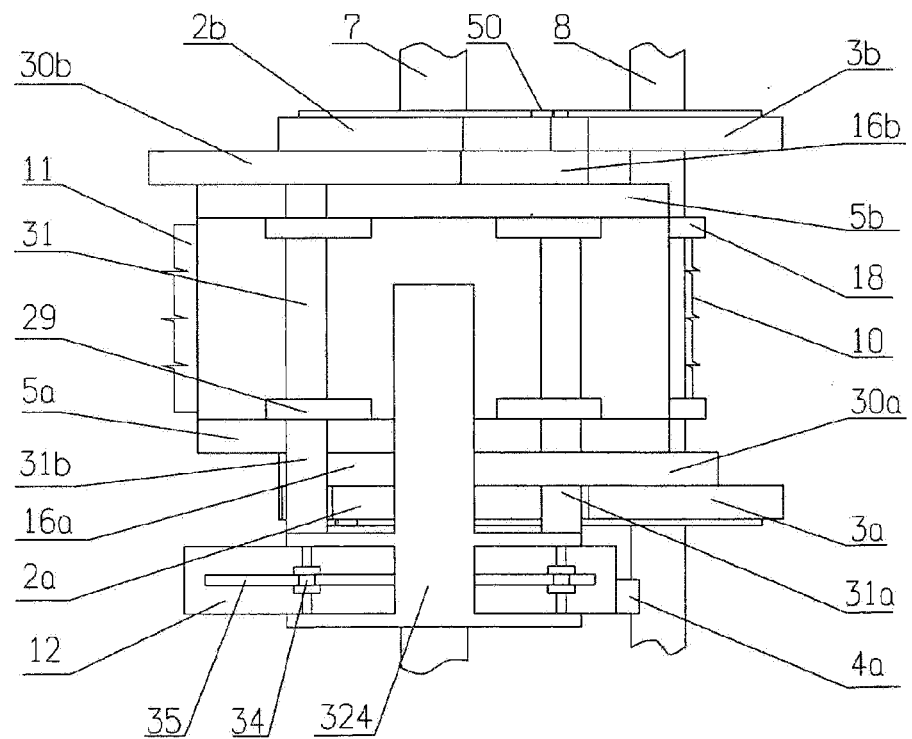
Figures 4, 6:
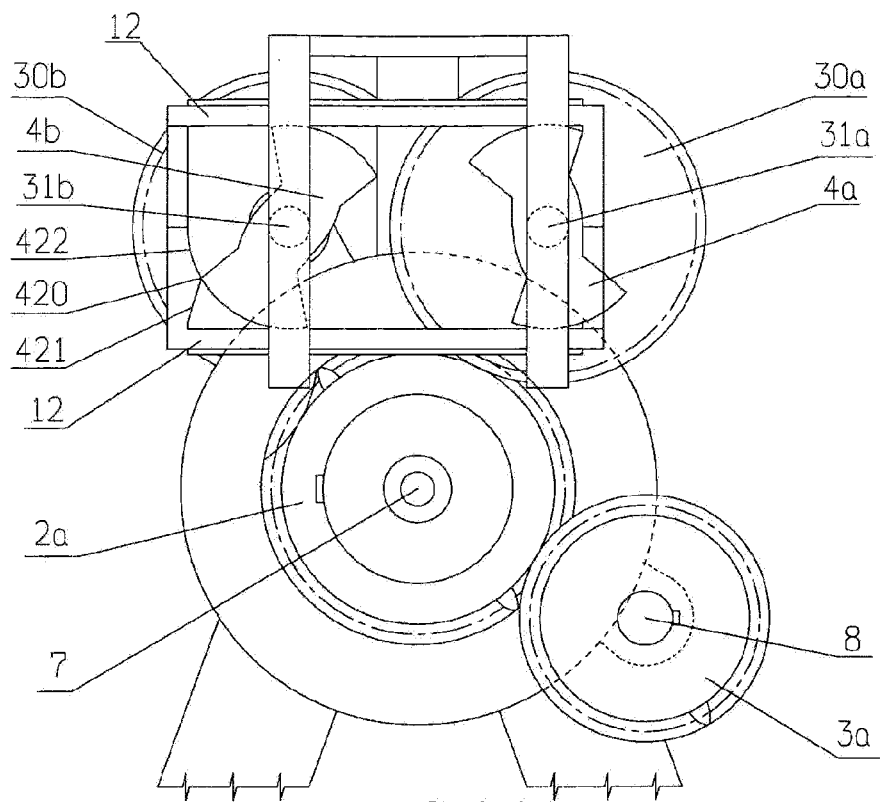
Figures 5, 6:
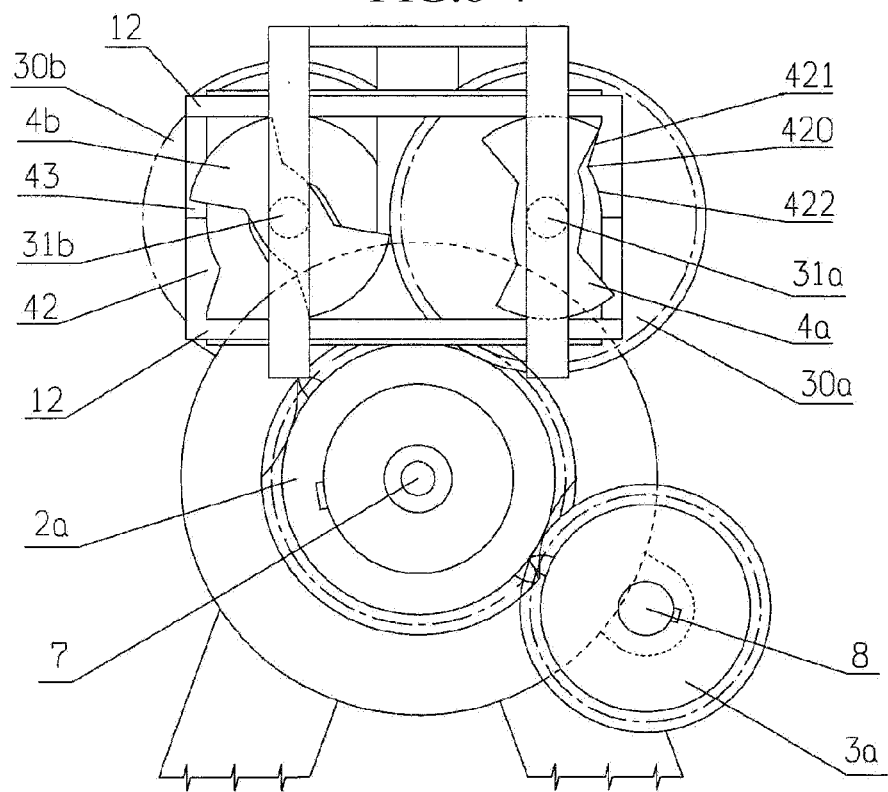
Figures 6, 7:
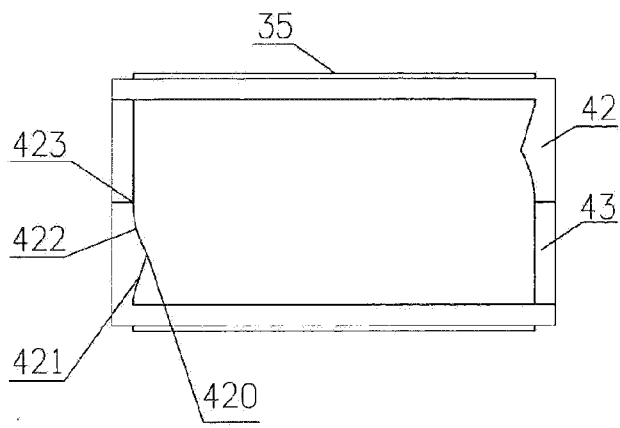
Figures 6, 7, 8, 9:
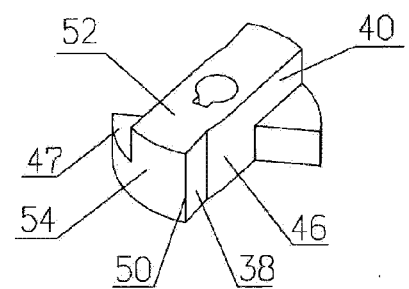
Figure 6:
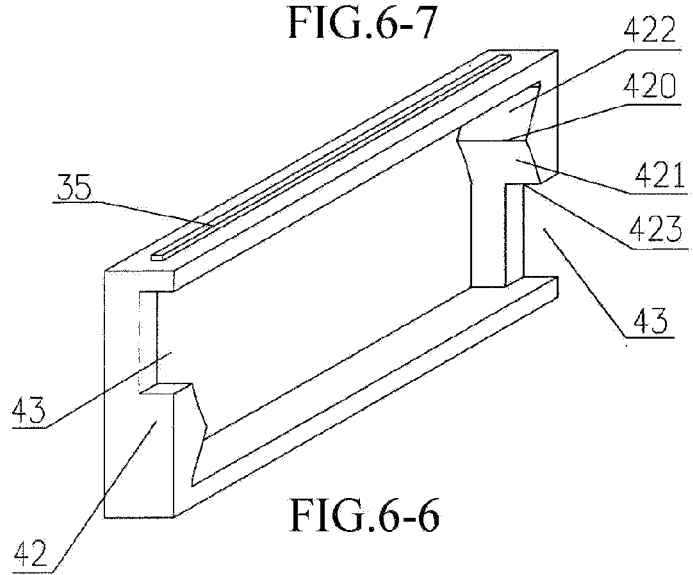
Figures 6, 7, 8, 9, 10:
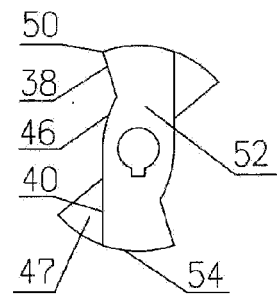
Figures 6, 7, 8:
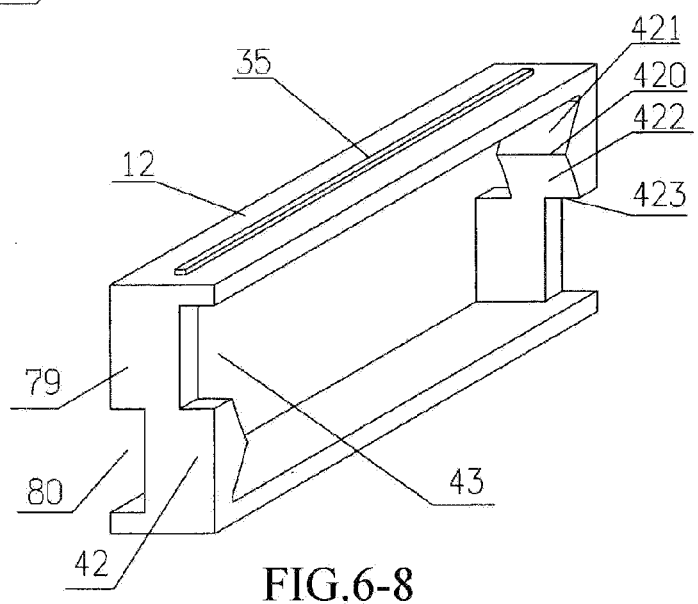
Figures 6, 7, 8, 9, 10, 11, 12, 13, 14:
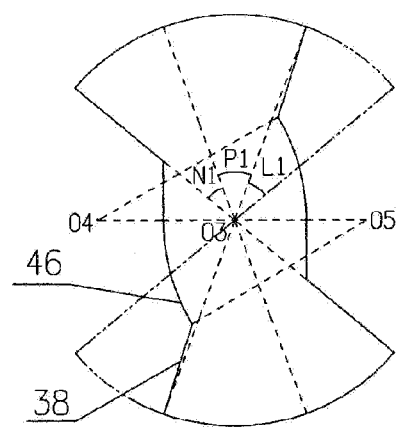
Figures 1, 7:
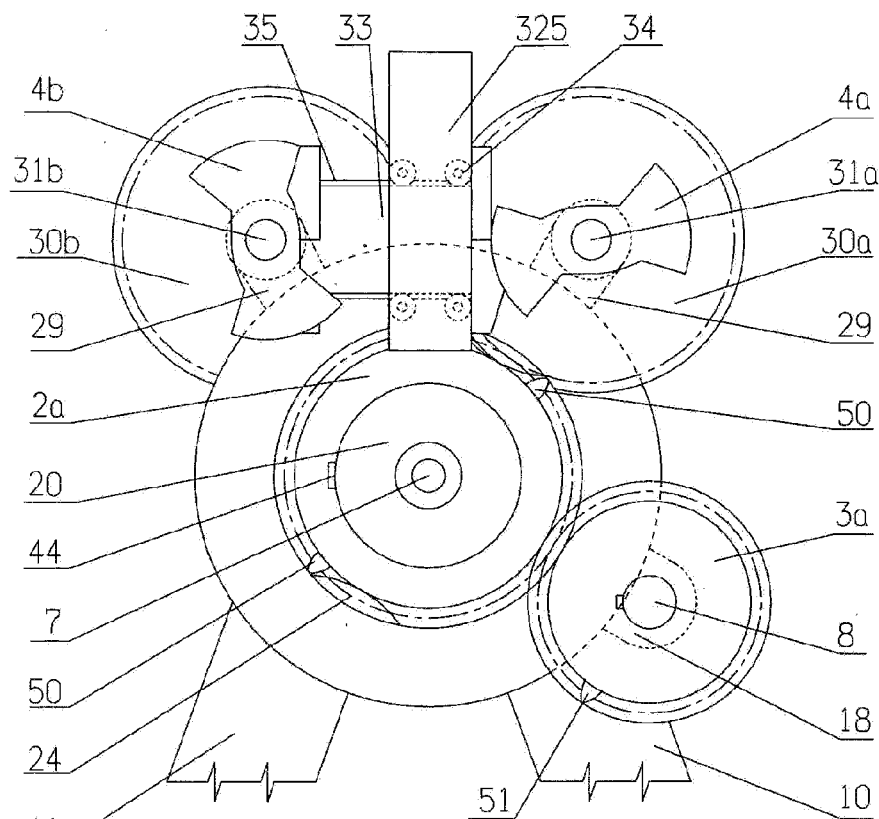
Figures 2, 7:
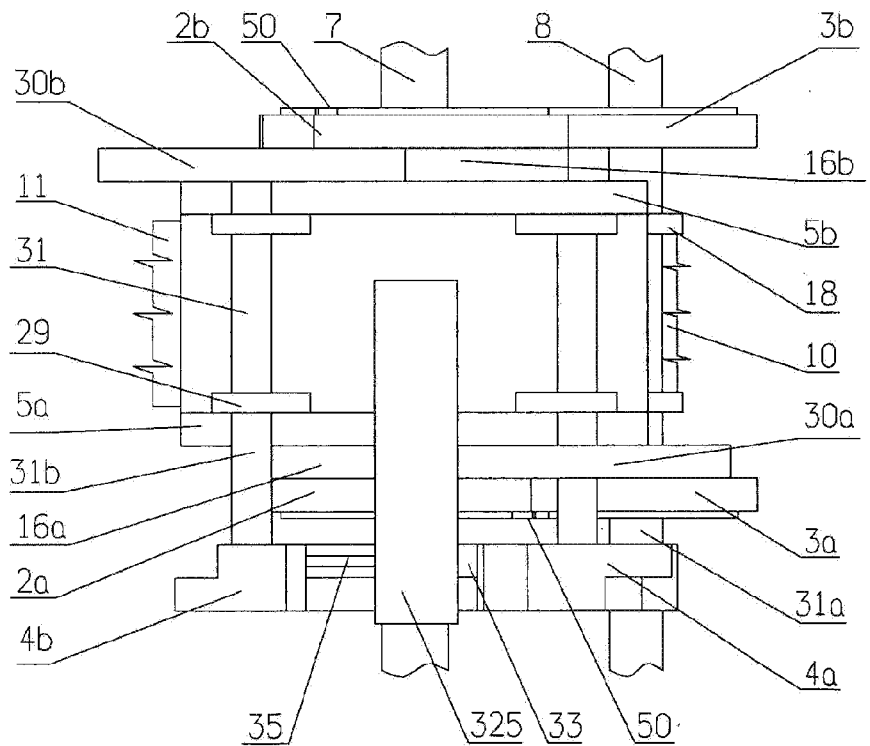
Figures 3, 7:
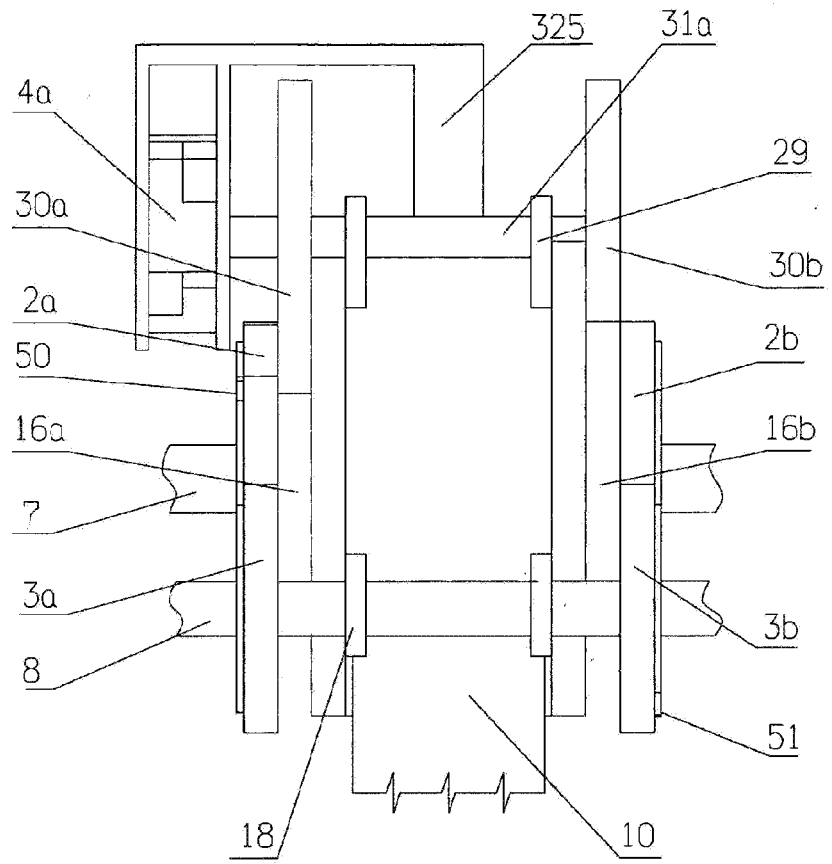
Figures 4, 7:
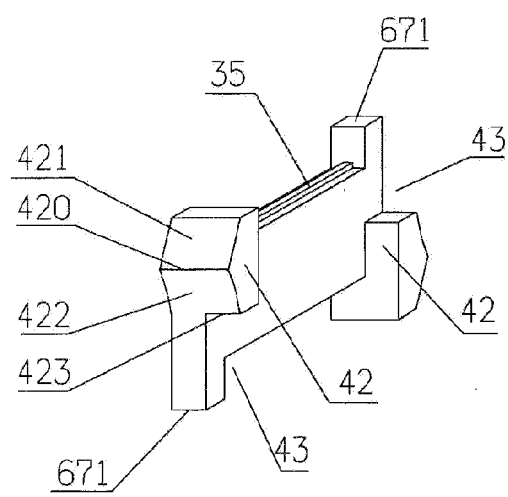
Figures 5, 7:
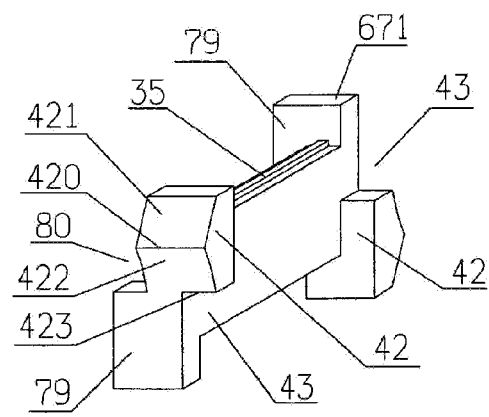
Figure 8:
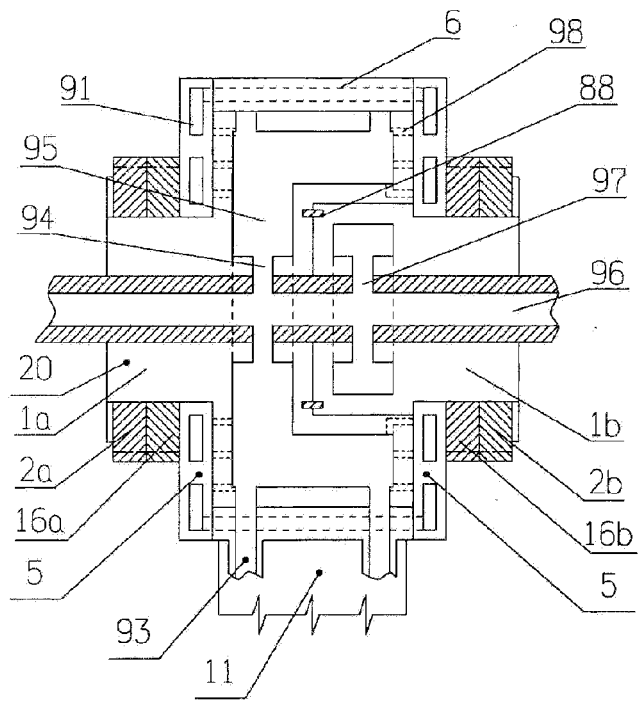
Figures 1, 9:
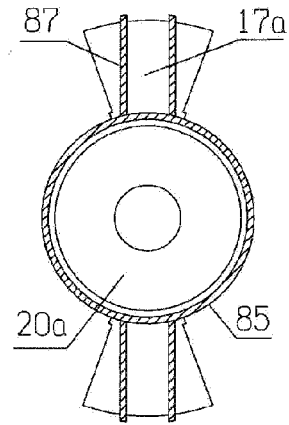
Figures 2, 9:
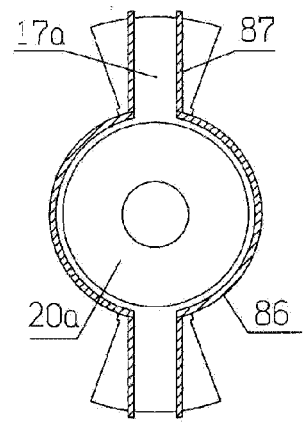
Figures 3, 9:
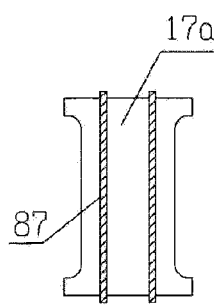
Figures 4, 9:
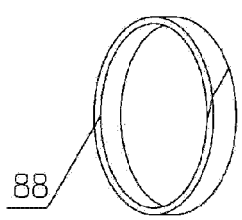
Figures 5, 9:
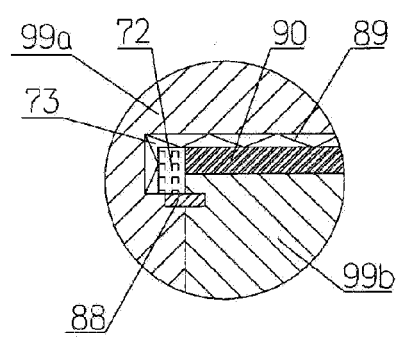
Figures 1, 10:
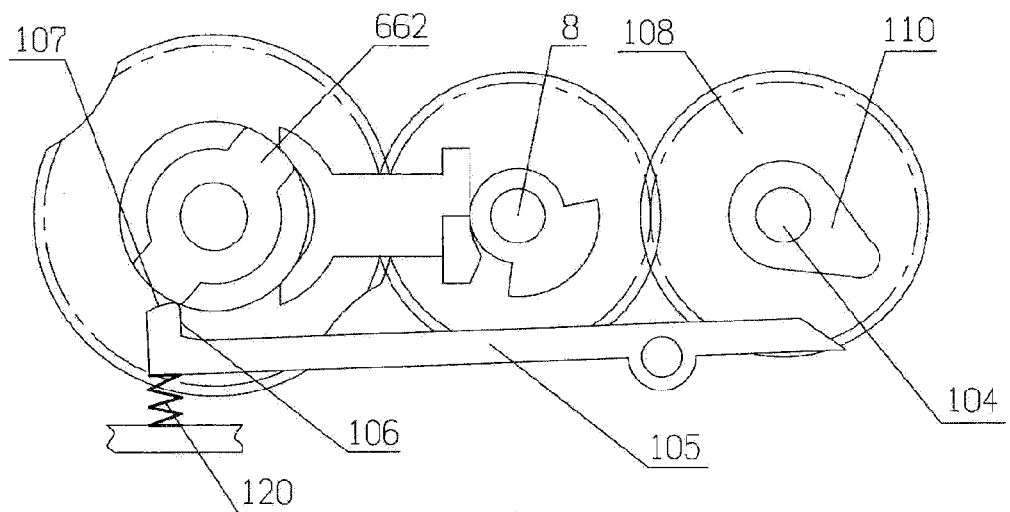
Figures 2, 10:
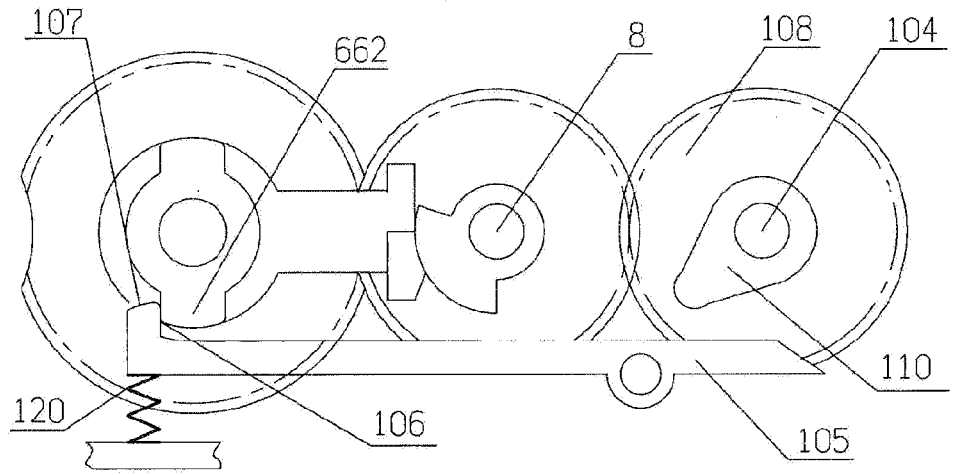
Figures 3, 10:
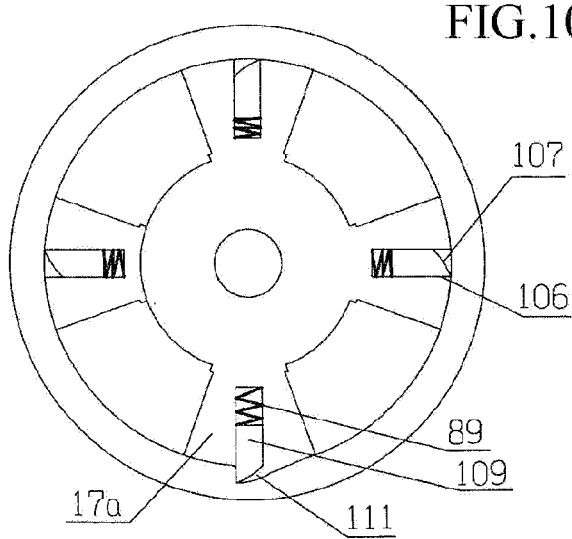
Figure 13:
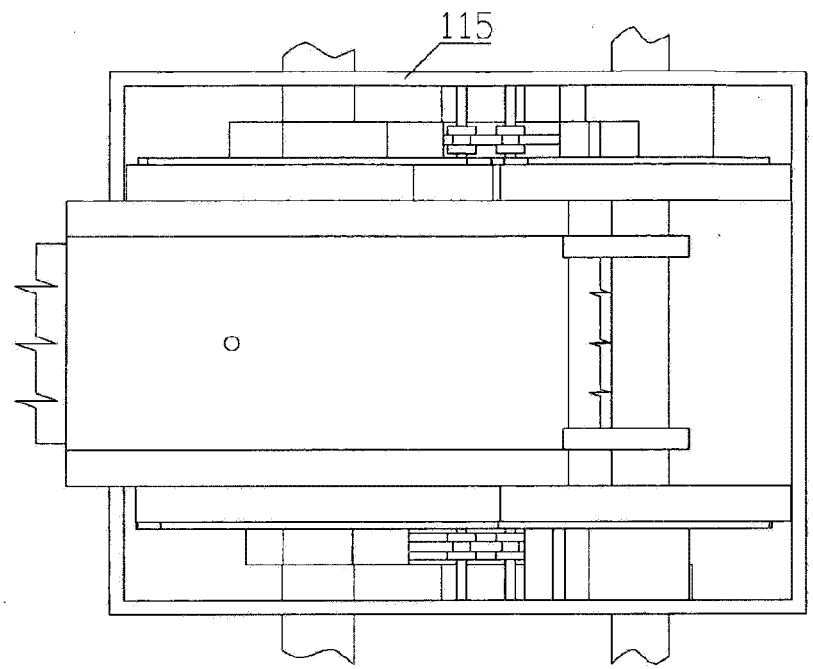
Figures 1, 11:
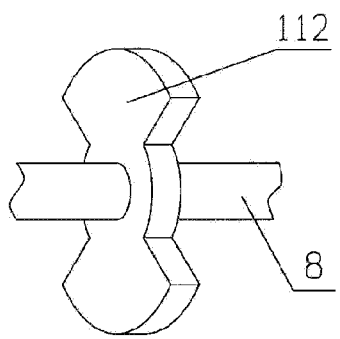
Figures 2, 11:
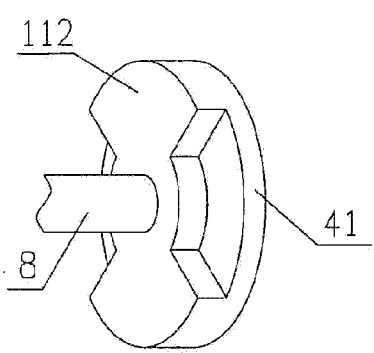
Figure 14:
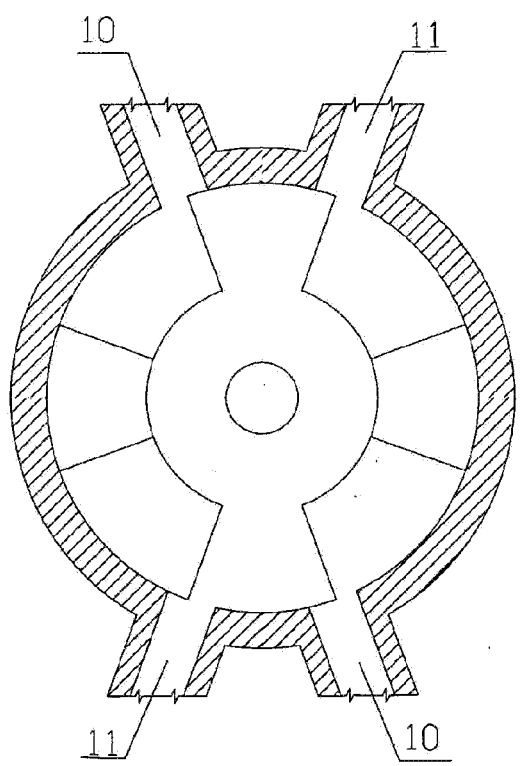
Figures 1, 12:
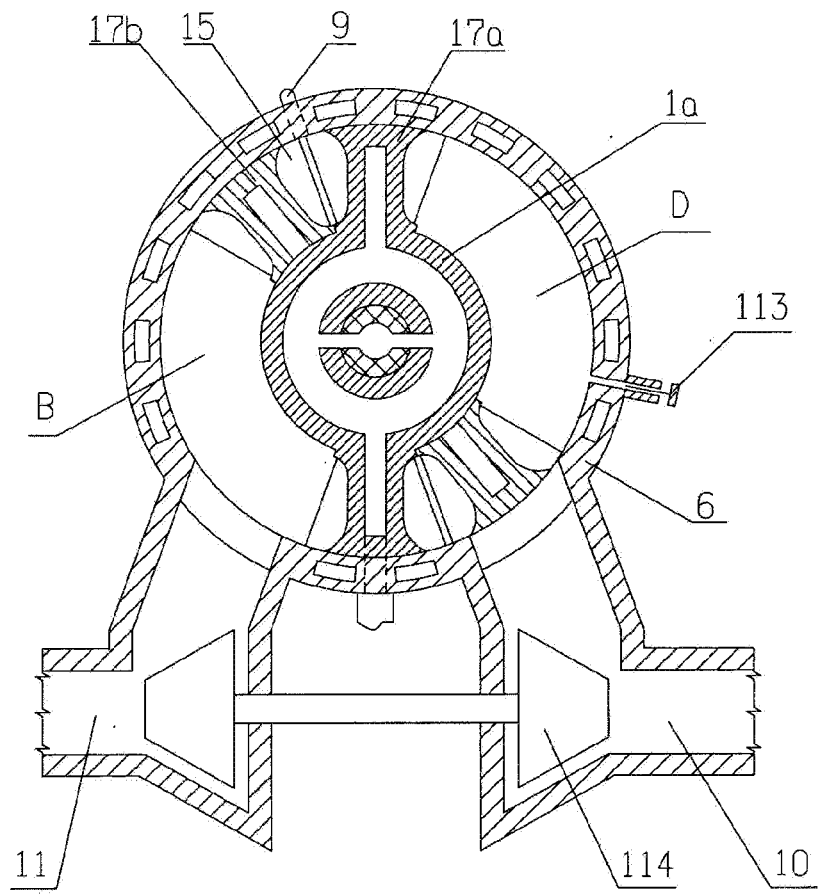
Figures 2, 12:
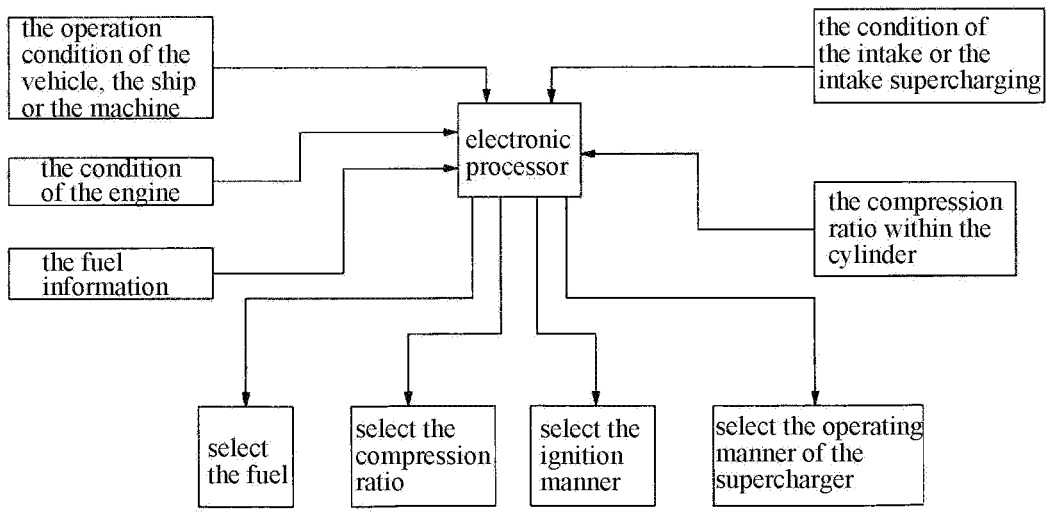

As illustrated in FIG. 13, a housing 115 may be provided outside of the rotor control system and the transmission system of the engine, and the lubricant is filled within the housing in order to lubricate and cool the rotor control mechanism and the transmission mechanism.

As illustrated in FIG. 14, an embodiment in which another inlet port 10 and another outlet port 11 may be provided for the dual-rotor engine of the present invention to form the compressor or the pump is shown. In this embodiment, the cylinder, the control mechanism and the transmission mechanism are identical to those of the above-described dual-rotor engine, except that there are two intake ports 10 and two outlet ports 11 in the same cylinder, in which the two intake ports 10 and the two outlet ports 11 are spaced from each other and arranged centrosymmetrically. Therefore, the two rotors divide the cylinder into two suction chambers and two compression chambers, which have only two strokes of suction and compression.

INDUSTRIAL APPLICABILITY

In conclusion, the present invention enables the four operation strokes of the engine, i.e., an intake stroke, a compression stroke, a power stroke and an exhaust stroke, to operate synchronously, so that the efficiency of the engine can be enhanced as four times as before. The engine of the present invention has small volume, light weight, strong driving force and power, and can save a great deal of space and weight for the engine and the battery in the hybrid power application. The high modularization and flexible assembly of the engine enable to reduce the investment of the manufacturing equipment effectively. With the two rotors, the rotor control mechanism and the transmission mechanism operating in cooperation, the dual-rotor engine of the present invention can achieve the control to the operating state of the two rotors, in particular achieve the timing control of the rotors. Thus, the power of the two rotors can be reliably accumulated to one single output shaft, and outputted smoothly in a constant speed. Therefore, such an engine is indeed able to operate and has practicality.

Although the present invention has been described with reference to several exemplary embodiments, it should be understood that the foregoing embodiments disclosed herein are used for more apparently illustrating the spirit and features of the present invention, and are not limited by any way of the details of the foregoing description. Rather, all modifications or equivalents, if any, are intended to fall within the scope of the present invention. Accordingly, the above-described embodiments should be construed broadly within the spirit and scope of the present invention as defined by the appended claims, such that all the modifications and variations falling into the claims and their equivalents should be covered by the appended claims.

What is claimed is:

1. A dual-rotor engine comprising a cylinder assembly, a transmission output mechanism, a rotor control mechanism and a lubrication system, wherein the cylinder assembly comprises: a base; a tubular cylinder fixedly installed on the base; a front and rear end cover installed on opposed ends of the tubular cylinder, each of the front and rear end covers being provided with a rotor journal aperture; a center supporting shaft passing through the tubular cylinder and rotatably installed on the base at two ends thereof; and a first and second rotor fixedly installed on the center supporting shaft, each of which comprises an inner cylindrical cylinder, a rotor journal integrated with the inner cylindrical cylinder and two sector pistons fixedly connected to the inner cylindrical cylinder symmetrically, two rotor journals protruding outward from the corresponding rotor journal aperture respectively, the two rotors having four sector pistons arranged crosswise to each other, both sides of each sector piston being provided with a recess respectively, adjacent recesses of two adjacent sector pistons defining a combustion chamber that has an indentation oriented towards the inner cylindrical cylinder, wherein:

the transmission output mechanism comprises a transmission output shaft installed in parallel with the center supporting shaft, a first and second rotor gear installed on the two rotor journals, and a first and second driving gear installed on the transmission output shaft, wherein the first rotor gear is engaged with the first driving gear, and the second rotor gear is engaged with the second driving gear;

each of the first and second rotor gears is provided with two toothless portions in a circumference direction symmetrically, the length and shape of the toothless portion are identical to those of the portion where the rotor gear is engaged with the driving gear, such that the operation of the first and second driving gears will not be interfered when the first and second rotor gears are locked up; two toothed segments of the first and second rotor gears have the same tooth number, and the tooth profiles at the beginning of the two toothed segments are identical so as to ensure transmission precision;

the rotor control mechanism is used for controlling intermittent rotation and stop of the two rotors and for controlling rotating time and stopping time, so as to ensure that the power is outputted smoothly in a constant speed.

2. The dual-rotor engine according to claim 1, wherein the sector piston has a sector angle in a range from 35° to 45°.

3. The dual-rotor engine according to claim 1, wherein each of the sector pistons has a vibration and noise reduction surface on roots of two sides thereof close to the inner cylindrical cylinder, and two adjacent vibration and noise reduction surfaces are contacted and engaged with each other.

4. The dual-rotor engine according to claim 1, wherein a sealing is provided between two inner cylindrical cylinders of the two rotors, and a sealing is provided between each sector piston and corresponding inner cylindrical cylinder.

5. The dual-rotor engine according to claim 1, wherein the rotor gear is a spur gear.

6. The dual-rotor engine according to claim 1, wherein the center supporting shaft is in a shape of tubular, has a center conduit, and is provided with an injection hole at a position where the rotor is installed, wherein an aperture passage is provided within each of the two rotors, and an oil outlet conduit is communicated with a cylinder wall of the cylinder, and a plurality of conduits are provided in the cylinder, the disk-shaped front end cover and rear end cover respectively, such that the center conduit, the aperture passages and the plurality of conduits can be communicated with each other.

7. The dual-rotor engine according to claim 1, wherein the rotor gear is a cylindrical helical gear, each rotor gear is provided with a convex ring, which protrudes outward from one end of a cylinder body thereof and has an outer circumference surface located on the dedendum circle of the rotor gear, and two positioning straight teeth for rotor gear, with tooth depth equal to that of the rotor gear, are provided on the outer circumference surface of the convex ring of the rotor gear centrosymmetrically, and are disposed on the positions adjacent to two toothless portions respectively; the driving gear is provided with a convex ring, which protrudes outward from one end of a cylinder body thereof and has an outer circumference surface located on the dedendum circle of the driving gear, one positioning straight tooth for driving gear, with tooth depth equal to that of the driving gear, is provided on the outer circumference surface of the convex ring of the driving gear centrosymmetrically; when the first rotor is in a timing unlocked state, one of the positioning straight teeth for rotor gear on the first rotor gear abuts against the positioning straight tooth for driving gear on the first driving gear, with the smallest angle between two adjacent positioning straight teeth for rotor gear on the first and second rotor gears being equal to the sector angle of the sector piston, and the installation angle between two positioning straight teeth for driving gear on the two driving gears is 180°.

8. The dual-rotor engine according to claim 1, wherein the rotor control mechanism comprises a controller bracket fixedly installed with respect to the tubular cylinder and provided with several pairs of pulleys, two sector control wheels, two brake journals and two reciprocating members, wherein the several pairs of pulleys are installed on the controller bracket;

both of the sector control wheels are installed on the transmission output shaft and are disposed on the outside of the two driving gears respectively, with an installation angle between the two sector control wheels being 180°;

the sector control wheel comprises an inner cylindrical portion installed on the transmission output shaft, and a sector portion provided at the inner cylindrical portion and having an outer arced surface as an arced surface for pushing and supporting; the sector portion has a part extending outward from its rear side surface to form a sector rearward-protruding wing, which has a thickness thinner than that of the sector portion; one surface of the sector rearward-protruding wing and one surface of the sector portion lie in the same plane, and another surface of the sector rearward-protruding wing is lower than another surface of the sector portion, such that a rearward-protruding wing indentation for preventing rotation interference is defined above the sector rearward-protruding wing;

the brake journal comprises an inner circle ring provided on and integrated with an end of the rotor journal and two brake bulges arranged symmetrically on the inner circle ring, wherein the angle (∠P) between the diagonals of two brake bulges lying in the same plane is in a range from 10° to 50°; the upper and lower surfaces of the inner circle ring and the brake bulges lie in the same plane respectively, and a part of outer circumferential surface of the inner circle ring forms a C-shaped brake groove together with side surfaces of the two brake bulges adjacent thereto;

the reciprocating member comprises a body, a guide rail provided on the body and operated in cooperation with the pulleys on the controller bracket, a C-shaped brake clamp provided on one side of the body and operated in cooperation with the C-shaped brake groove on the rotor journal, and a rectangular block provided on the other side opposing to the one side of the body, wherein the rectangular block is provided with a timing unlocked boss for pushing, the bottom surface of which and the bottom surface of the rectangular block are located in the same plane and the top surface of which is lower than that of the rectangular block, such that a rear timing indentation for prevent rotation interference is defined between the top surface of the timing unlocked boss for pushing and the rectangular block;

the lower outside of the timing unlocked boss for pushing is an inclined surface or arced surface, the upper outside of the timing unlocked boss for pushing is an arced surface for pushing, the arced surface for pushing has a shape conformed to the shape of the arced surface for pushing and supporting of the sector control wheel, and the inclined surface and the arced surface for pushing extend to the outer surface of the rectangular block respectively.

9. The dual-rotor engine according to claim 8, wherein the angle (∠P) between the diagonals of the two brake bulges is 40°.

10. The dual-rotor engine according to claim 8, wherein the sector portion of the sector control wheel has a part extending outward from its rear surface to form a sector forward-protruding wing; a guide convex strip is provided on the front end of the sector forward-protruding wing; the sector forward-protruding wing and the sector rearward-protruding wing are provided on both sides of the sector portion and arranged in a staggered manner; the sector forward-protruding wing has a thickness thinner than that of the sector portion, one surface of the sector forward-protruding wing and one surface of the sector portion lie in the same plane, and another surface of the sector forward-protruding wing is lower than another surface of the sector portion, such that a forward-protruding wing indentation for preventing rotation interference is defined between the sector forward-protruding wing and the sector portion.

11. The dual-rotor engine according to claim 8, wherein the body of the reciprocation member is a rectangular plate, the C-shaped brake clamp is fixed at one end of the rectangular block and the rectangular block is fixed at the other end of the rectangular plate; both the C-shaped opening of the C-shaped brake clamp and the arced surface for pushing of the timing unlocked boss for pushing face towards the outer side.

12. The dual-rotor engine according to claim 8, wherein the body of the reciprocation member is a rectangular frame, the C-shaped brake clamp and the rectangular block are fixed at both widthwise sides of the rectangular frame, and both the C-shaped opening of the C-shaped brake clamp and the arced surface for pushing of the timing unlocked boss for pushing face towards the inner side.

13. The dual-rotor engine according to claim 8, further comprising a controller shaft installed in parallel with the transmission output shaft and a controller gear installed on the controller shaft, wherein one of the sector control wheels is installed on the controller shaft, the controller gear is engaged with the corresponding one of the driving gears, and one of the reciprocating members is installed between the brake journal of the corresponding rotor and the sector control wheel.

14. The dual-rotor engine according to claim 1, wherein the rotor control mechanism comprises a controller bracket installed fixedly with respect to the tubular cylinder and provided with several pairs of pulleys, two controller gear shafts arranged in parallel with the transmission output shaft, a first control gear and a first bowknot-shaped control wheel installed in the front of one of the controller gear shafts, a second control gear and a second bowknot-shaped control wheel installed in the rear of the other controller gear shaft, a reciprocating member controlled by two bowknot-shaped control wheels to perform reciprocating movement, a first rotor control gear installed on the first rotor journal, and a second rotor control gear installed on the second rotor journal, wherein the first control gear is engaged with the first rotor control gear, and the second control gear is engaged with the second rotor control gear;

the reciprocating member is provided with two rectangular blocks and two timing unlocked bosses for pushing that are arranged centrosymmetrically, wherein the bottom surface of the timing unlocked boss for pushing and the bottom surface of the rectangular block lie in the same plane, and the top surface of the timing unlocked boss for pushing is lower than the top surface of the rectangular block, such that a rear timing indentation for preventing rotation interference is defined between the top surface of the timing unlocked boss for pushing and the rectangular block; the lower outside of the timing unlocked boss for pushing is an inclined surface or arced surface, the upper outside of the timing unlocked boss for pushing is an arced surface for pushing, and the inclined surface and the arced surface for pushing extend to the outside surface of the rectangular block respectively;

the bowknot-shaped control wheel is a rectangular body having two main surfaces, two lengthwise surfaces and two widthwise surfaces, wherein the angle (∠P) between the diagonals on the main surface of the rectangular body is in a range from 10° to 50°; each widthwise surface of the rectangular body is an arced pushing surface conformed to the arced surface for pushing of the timing unlocked boss for pushing of the reciprocating member, and each lengthwise surface of the rectangular body is composed of a planar surface connected with one of the arced pushing surfaces, an arced surface connected with the planar surface in a smooth transition and concaved into the rectangular body, and an inclined surface connecting the arced surface and the arced pushing surface; when the first bowknot-shaped control wheel is locked up, the inclined surface of the reciprocating member and the inclined surface of the first bowknot-shaped control wheel abut against each other, and the arced surface for pushing of the reciprocating frame and the arced surface of the first bowknot-shaped control wheel abut against each other.

15. The dual-rotor engine according to claim 14, wherein the bowknot-shaped control wheel further comprises two forward-protruding wings arranged centrosymmetrically, which are formed by extending the rectangular body of the bowknot-shaped control wheel outward from the inclined surface of the rectangular body, the forward-protruding wing has a thickness thinner than that of the rectangular body, one surface of the forward-protruding wing and one main surface of the rectangular body lie in the same plane, another surface of the forward-protruding wing is lower than another main surface of the rectangular body, a guide convex strip is provided on the front end of the forward-protruding wing, and the forward-protruding wing and the rearward-protruding wing are provided on both sides of the lengthwise surfaces of the rectangular body respectively and arranged centrosymmetrically in a staggered manner.

16. The dual-rotor engine according to claim 14, wherein the reciprocating member is a rectangular frame, while the two rectangular blocks are the widthwise sides of the rectangular frame, and the arced surface for pushing of the timing unlocked boss for pushing faces towards the inside of the rectangular frame.

17. The dual-rotor engine according to claim 14, wherein the reciprocating member is a rectangular block, and the arced surface for pushing of the timing unlocked boss for pushing faces towards the outside of the rectangular frame.

18. The dual-rotor engine according to claim 1, further comprising a rotor reverse blocking device, wherein the rotor reverse blocking device comprises a camshaft in parallel with the transmission output shaft, a swing driven member and a spring, wherein a cam gear and a disc cam are installed on the camshaft, and the cam gear is engaged with the driving gear; the swing driven member comprises a swing rod and a L-shaped erecting triangular end arranged at one end of the swing rod and operated in cooperation with the brake bulges of the brake journal, with the triangular end having a standup surface and an inclined surface; and the triangular end is pressed against the brake bulges by the spring.

19. The dual-rotor engine according to claim 1, wherein at least one through hole is drilled in the intake compression region of the tubular cylinder or at the middle portion of a cylinder wall of the tubular cylinder, and an intake relief valve is installed in each through hole.

20. The dual-rotor engine according to claim 1, further comprising an electronic processor, which is used to receive and process an information on the operation condition of a vehicle, ship or machine, an information on the condition of the engine, a fuel information, an intake or intake supercharging information, and an information on a compression ratio within the cylinder assembly, so as to select the fuel, compression ratio, ignition manner and operating manner of the supercharger, then convey these selected results to an actuating unit, such that the effect of the variable compression ratio can be improved.

21. The dual-rotor engine according to claim 1, wherein the dual-rotor engine is further provided with a housing on the outside thereof, and the lubricant is filled within the housing in order to lubricate and cool the rotor control mechanism and the transmission mechanism.

22. The dual-rotor engine according to claim 1, wherein the sector piston has a sector angle of 40°.

* * * * *